(12) United States Patent
Choi et al.

(10) Patent No.: US 12,299,201 B2
(45) Date of Patent: May 13, 2025

(54) SYSTEMS AND METHODS FOR PROVIDING TACTILE FEEDBACK TO A USER

(71) Applicant: The Texas A&M University System, College Station, TX (US)

(72) Inventors: Changhyun Choi, College Station, TX (US); Mary Cynthia Hipwell, College Station, TX (US); Yuan Ma, College Station, TX (US); Jonathan R. Felts, College Station, TX (US)

(73) Assignee: The Texas A&M University System, College Station, TX (US)

( * ) Notice: Subject to any disclaimer, the term of this patent is extended or adjusted under 35 U.S.C. 154(b) by 0 days.

(21) Appl. No.: 18/286,524

(22) PCT Filed: Apr. 13, 2022

(86) PCT No.: PCT/US2022/024689
§ 371 (c)(1),
(2) Date: Oct. 11, 2023

(87) PCT Pub. No.: WO2022/221454
PCT Pub. Date: Oct. 20, 2022

(65) Prior Publication Data
US 2024/0201783 A1 Jun. 20, 2024

Related U.S. Application Data

(60) Provisional application No. 63/174,402, filed on Apr. 13, 2021.

(51) Int. Cl.
*G06F 3/041* (2006.01)
*G06F 1/16* (2006.01)
(Continued)

(52) U.S. Cl.
CPC .............. *G06F 3/016* (2013.01); *G06F 1/163* (2013.01); *G06F 1/206* (2013.01); *G06F 3/0416* (2013.01)

(58) Field of Classification Search
CPC ...................................................... G06F 3/016
See application file for complete search history.

(56) References Cited

U.S. PATENT DOCUMENTS

2012/0280920 A1* 11/2012 Jackson .................. G06F 3/016
345/173
2013/0120290 A1* 5/2013 Yumiki ................. G06F 3/0488
345/173

(Continued)

FOREIGN PATENT DOCUMENTS

KR 10-0867408 B1 11/2008

OTHER PUBLICATIONS

International Search Report and Written Opinion dated Aug. 5, 2022, for Application No. PCT/US2022/024689.

*Primary Examiner* — Nan-Ying Yang
(74) *Attorney, Agent, or Firm* — Conley Rose, P.C.

(57) ABSTRACT

A system for providing tactile feedback to a user includes a device comprising a touch surface to be touched by the user, one or more thermal elements distributed across the touch surface of the device and configured to heat the touch surface and thereby modulate the friction between the user's skin and the touch surface, and a controller connected to the one or more thermal elements and configured to control the operation of the one or more thermal elements to provide a plurality of predefined temperature distributions across the touch surface.

15 Claims, 16 Drawing Sheets

(51) Int. Cl.
    *G06F 1/20*     (2006.01)
    *G06F 3/01*     (2006.01)

(56) References Cited

U.S. PATENT DOCUMENTS

| | | | |
|---|---|---|---|
| 2017/0060239 A1* | 3/2017 | Lim | G06F 3/0488 |
| 2017/0269691 A1* | 9/2017 | Fleureau | G06F 3/03545 |
| 2017/0293740 A1* | 10/2017 | Xing | G06Q 20/204 |
| 2018/0039331 A1* | 2/2018 | Warren | G06F 3/043 |
| 2019/0121438 A1* | 4/2019 | Khoshkava | G06F 3/016 |
| 2020/0150857 A1 | 5/2020 | Birnbaum et al. | |

* cited by examiner

SYSTEMS AND METHODS FOR PROVIDING TACTILE FEEDBACK TO A USER

CROSS-REFERENCE TO RELATED APPLICATIONS

This application a 35 U.S.C. § 371 national Stage application of PCT/US2022/024689 filed Apr. 13, 2022, and entitled "Systems and Methods for Providing Tactile Feedback to a User" which claims benefit of U.S. provisional patent application Ser. No. 63/174,402 filed Apr. 13, 2021, and entitled "Systems and Methods for Providing Tactile Feedback to a User," both of which are hereby incorporated herein by reference in their entirety for all purposes.

STATEMENT REGARDING FEDERALLY SPONSORED RESEARCH OR DEVELOPMENT

Not applicable.

BACKGROUND

Haptic technology refers generally to technology aimed at modifying a sense of touch of a user by applying one or more forces, vibrations, or motions to the user. Applications of haptic technology include, among other things, human-machine interfaces (HMIs), teleoperation, remote collaboration, virtual reality (VR), and augmented reality. Haptic feedback, from incorporating the sense of touch through cutaneous and kinesthetic channels, may deliver more realistic feedback for human-machine interactions. Mechanical and electrical stimuli are most commonly used to provide haptic feedback. Haptic feedback may be incorporated in the form of surface haptic devices (SHDs) which have an interactive touch surface that provides users with tactile feedback on the touch surface and enables functions otherwise impossible with traditional touchscreens such as texture rendering and the rendering of virtual objects.

BRIEF SUMMARY OF THE DISCLOSURE

An embodiment of a system for providing tactile feedback to a user comprises a device comprising a touch surface to be touched by the user, one or more thermal elements distributed across the touch surface of the device and configured to heat the touch surface and thereby modulate the friction between the user's skin and the touch surface, and a controller connected to the one or more thermal elements and configured to control the operation of the one or more thermal elements to provide a plurality of temperature distributions across the touch surface. In some embodiments, the modulation of the friction between the user's skin and the touch surface is configured to render a haptic effect discernible to the user. In some embodiments, the haptic effect is configured to mimic interaction with a virtual object. In certain embodiments, the touch surface comprises an electronic touchscreen. In certain embodiments, the device is wearable by the user. In some embodiments, the system comprises a cooling system coupled to the touch surface and configured to transfer heat generated by the one or more thermal elements away from the touch surface. In some embodiments, the cooling system comprises one or more fluid conduits configured to transport a coolant for receiving the heat generated by the one or more thermal elements. In certain embodiments, the one or more thermal elements comprise one or more thermoelectric heating elements. In certain embodiments, the one or more thermal elements comprise at least one of one or more resistive heating elements, one or more optical heating elements, and one or more chemical heating elements.

An embodiment of a system for providing tactile feedback to a user comprises a device comprising an exterior touch surface to be touched by the user, one or more thermal elements distributed across the touch surface and configured to heat the touch surface and thereby modulate the friction between the user's skin and the touch surface, and a controller connected to the one or more thermal elements and configured to control the operation of the one or more thermal elements to heat the touch surface, wherein the controller comprises a memory device storing a plurality of distinct temperature profiles providable along the touch surface by the one or more thermal elements. In some embodiments, the modulation of the friction between the user's skin and the touch surface is configured to render a haptic effect discernible to the user. In some embodiments, the haptic effect is configured to mimic interaction with a virtual object. In certain embodiments, the touch surface comprises an electronic touchscreen. In certain embodiments, the device is wearable by the user. In some embodiments, the system comprises a cooling system coupled to the touch surface and configured to transfer heat generated by the one or more thermal elements away from the touch surface.

An embodiment of a method for providing tactile feedback to a user comprises (a) activating one or more of a plurality of thermal elements distributed across an exterior touch surface of a device to provide a predefined first temperature distribution across the touch surface and modulate the friction between the user's skin and the touch surface, and (b) activating one or more of the plurality of thermal elements to provide a predefined second temperature distribution across the touch surface that is different from the first temperature distribution and modulate the friction between the user's skin and the touch surface. In some embodiments, the modulation of the friction between the user's skin and the touch surface produced by the first temperature distribution renders a first haptic effect discernible to the user, and the modulation of the friction between the user's skin and the touch surface produced by the second temperature distribution renders a second haptic effect discernible to the user. In some embodiments, the first haptic effect mimics interaction with a first tactile object and the second haptic effect mimics interaction with a second virtual object that is different from the first vertical object. In certain embodiments, the method comprises (c) transferring by a cooling system heat generated by the plurality of thermal elements away from the touch surface. In certain embodiments, (c) comprises transferring heat from the touch surface to a coolant circulating through the device.

BRIEF DESCRIPTION OF THE DRAWINGS

For a detailed description of exemplary embodiments of the disclosure, reference will now be made to the accompanying drawings in which.

DETAILED DESCRIPTION

Figure 1:
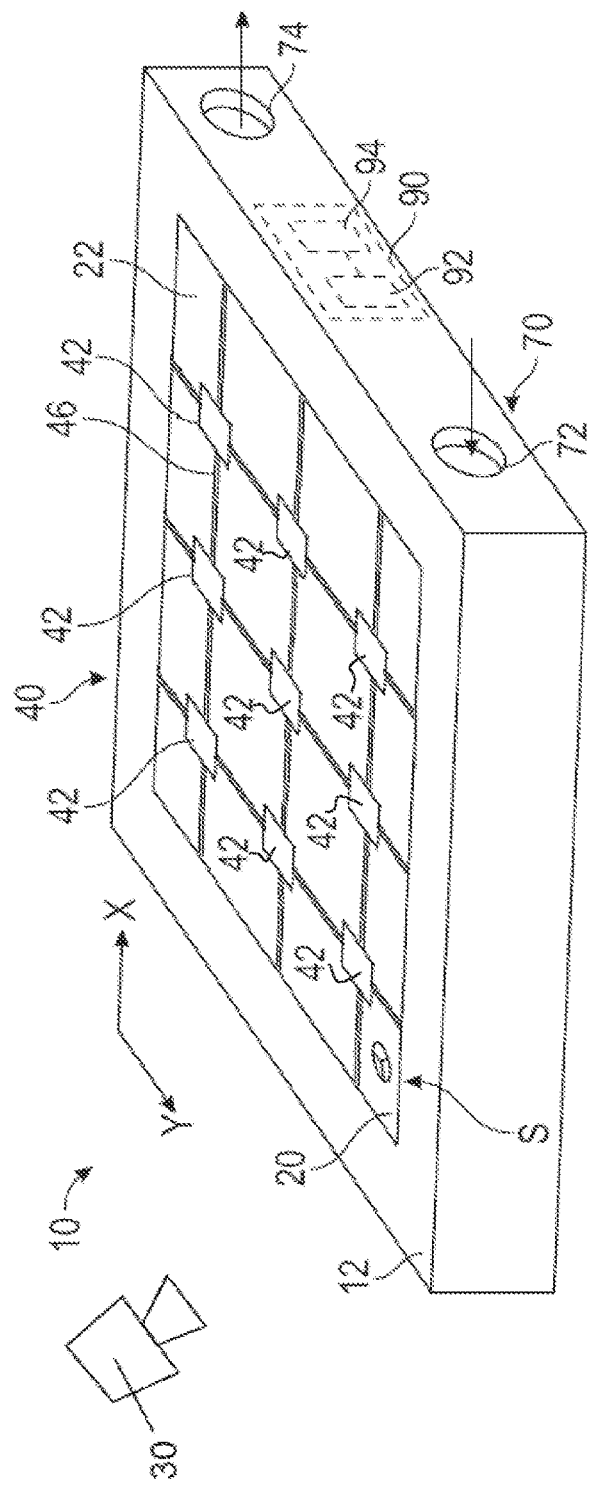
FIG. 1 is a schematic perspective view of an embodiment of a system for providing tactile feedback to a user.

The following discussion is directed to various exemplary embodiments.

However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. As used herein, the terms "approximately," "about," "substantially," and the like mean within 10% (i.e., plus or minus 10%) of the recited value. Thus, for example, a recited angle of "about 80 degrees" refers to an angle ranging from 72 degrees to 88 degrees.

As described above, haptic feedback may be incorporated in the form of SHDs having an interactive touch surface that provides users with tactile feedback on the touch surface. Conventional SHDs typically work by vibrating the touch surface at ultrasonic frequency or attracting the skin using an electrostatic effect called electroadhesion. Ultrasonic vibration decreases the force of friction by creating a lubricating squeeze film using surface vibration, whereas electroadhesion increases the force of friction using high-voltage electrostatic interaction typically on the scale of 100 volts (V) to 500 V between the user's fingertips and the touch surface.

While ultrasonic and electrostatic effects may be utilized to provide tactile feedback to the user, each face different challenges. As a first example, ultrasonic devices typically may only vibrate the entire screen and consume a significant amount of power when vibrating the entire screen to generate sufficient friction. As a second example, electroadhesion-based devices require high-voltage circuitry to generate sufficient friction between the user's fingertip and the screen, which increases the cost associated with producing the electroadhesion-based device.

Accordingly, embodiments of systems and methods for providing tactile feedback to a user are disclosed herein. Particularly, tactile feedback systems are described herein including a device having an exterior touch surface that is touchable by the user, and one or more thermal elements distributed across the touch surface (e.g., embedded within the touch surface) and configured to dynamically modulate friction between the user's skin and the touch surface by providing a plurality of distinct temperature distributions or profiles across the touch surface. In this manner, the tactile feedback system may, through the modulation of friction between the user's skin and the touch surface caused by the selective heating of the touch surface, render a haptic effect that is discernible to the user. As used herein, the term "haptic effect" refers to any subjective effect that alters a person's sense of touch through forces, vibrations, or motions. For instance, a first temperature profile or distribution provided across the touch surface may modulate the friction between the user's skin and the surface to render a first haptic effect while a second temperature profile or distribution may differently modulate the friction to render a second haptic effect that is different from the first haptic effect.

Additionally, the haptic effect rendered by the tactile feedback system mimics interaction with a virtual object. As used herein, the term "virtual object" refers to a virtual representation of an object that can be experienced tactilely. As one example, a virtual object may comprise a virtual representation of a physical object such as a bump that may be interacted with by the user of the tactile feedback system through a haptic effect. For instance, the system may produce a haptic effect to the user that mimics the user running their finger over a physical bump or protrusion (virtually represented through the haptic effect) formed on the touch surface.

The configuration of the device may vary dramatically depending on the given application. In an example, the device may comprise a portable electronic device with the touch surface comprising an exterior surface of an electronic touchscreen. In another example, the device may be wearable by the user (e.g., a garment, a headset or other headgear, a bracelet) whereby the touch surface of the device comes into contact with the user's moving skin.

In some embodiments, the tactile feedback system additionally includes a visual display which may display one or more different visual objects (symbols, shapes, images, etc.) visually to the user. The user may interact with the one or more different visual objects through the interaction which occurs between the user and the virtual object through the haptic effect created by the tactile feedback system. For instance, a first haptic effect rendered by the system may permit a user to interact with a first visual object displayed on the visual display, while a second haptic effect rendered by the system may permit a user to interact with a second visual object displayed on the visual display. Each virtual object may be (but not necessarily) linked or associated with a corresponding visual object.

Further, tactile feedback systems disclosed herein include one or more thermal devices or elements configured to provide a desired temperature profile or distribution across the touch surface that is associated with a desired friction change. The friction change may be associated with a haptic effect renderable on the touch surface. For example, in some embodiments, a controller of the system may activate the one or more thermal elements to render a given haptic effect as the user moves their skin across the surface. The activation of the one or more thermal elements adjusts or modulates a friction of at least a portion of the touch surface. Additionally, the user may interpret the change or modulation in surface friction as associated with a virtual object mimicked by the haptic effect.

Figure 2:
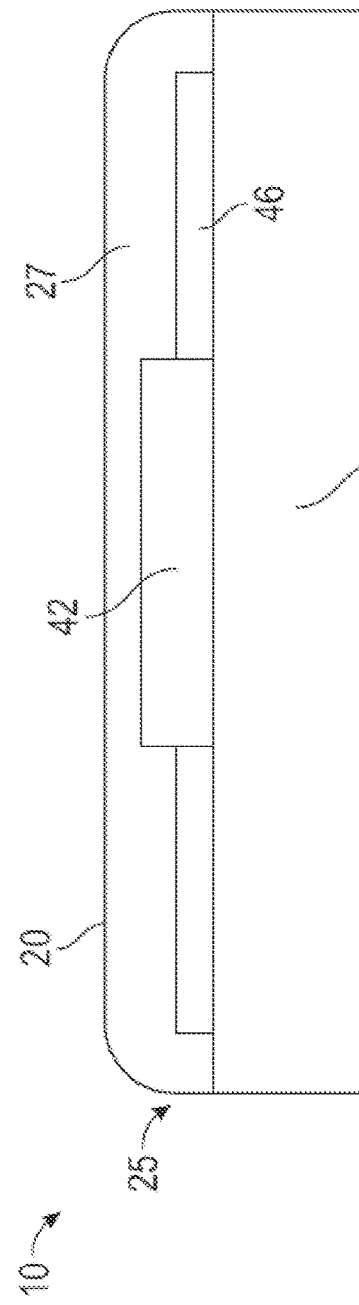
FIG. 2 is a cross-sectional view of the system of FIG. 1.

Referring initially to FIGS. 1 and 2, an embodiment of a system 10 for providing tactile feedback to a user is shown. In this exemplary embodiment, system 10 generally includes a device 12 having an exterior touch surface 20 to be touched by a user of system 10, a surface heating system 40, a surface cooling system 70, and a control system or system controller 90. As will be described further herein, surface heating system 40 and system controller 90 are configured to provide spatio-temporal control of the temperature distribution across the touch surface 20 to thereby provide tactile feedback to the user (touching touch surface 20) through the modulation of friction between the user's skin and the touch surface 20.

In some embodiments, device 12 comprises a self-contained, portable electronic device or SHD such as a tablet computer, a smart phone, etc. However, it may be understood that the configuration of device 12 may vary significantly in other embodiments. For example, in some embodiments, the device 12 may not be portable. In certain embodiments, device 12 comprises a wearable device such as a glove, a shirt, a bracelet, etc. or any other wearable device configured to come into contact with the user's moving skin. The touch surface 20 may be rigid or flexible. Additionally, in this exemplary embodiment, the surface heating system 40, cooling system 70, and system controller 90 are incorporated into the single self-contained device 12. In other embodiments, the system 10 may not be self-contained and may instead comprise several different components which are not physically connected together. For example, in other embodiments, the surface heating system 40 may be separate and physically disconnected from the touch surface 20.

In this exemplary embodiment, the touch surface 20 of system 10 is visual object 5 delimited by an outer periphery 22 which is generally two-dimensional in this exemplary embodiment (extending in the X and Y dimensions shown in FIG. 1). Additionally, in this exemplary embodiment, one or more visual objects 5 may also be visually displayed on the touch surface 20. Thus, in this exemplary embodiment, touch surface 20 also comprises a visual surface of system 10 from which one or more visual objects 5 may be displayed. It may be understood that in other embodiments the visual surface may be separate from the touch surface.

In still other embodiments, touch surface 20 may not be configured to visually display any visual object 5. In one non-limiting example, a visually impaired user may interact with the touch surface 20 through the selective modulation of friction between the user's skin and the touch surface 20. Particularly, touch surface 20 may produce a haptic effect discernible by the visually impaired user which is associated with or mimics interaction with a virtual object. For example, the user may experience, through the haptic effect, the sensation of running their finger over a physical bump formed on the touch surface 20.

In this exemplary embodiment, the visual surface is defined by an exterior surface of a visual display or electronic touchscreen 25 of the device 12 which includes several layers sandwiched together. For example, the touchscreen 25, in this exemplary embodiment, includes an outer protective layer 27 and a substrate 29. Protective layer 27 of touchscreen 25 defines the touch surface 20 which is physically touched by the user. In some embodiments, the protective layer 27 may be formed from glass or other protective materials. The substrate 29 of touchscreen 25 includes the components required for visibly generating visual objects 5 and for sensing the user's touch. For example, the substrate 29 may comprise a liquid crystal display (LCD) and one or more touch sensors (e.g., a capacitive grid).

It may be understood that in other embodiments the touchscreen 25 may not include touch sensors and thus may not comprise a touchscreen at all. Instead, other sensors and sensor systems may be utilized for monitoring contact between the user's skin and the touch surface 20. As an example, in some embodiments, system controller 90 may monitor the relative positions of the user's hand and the touch surface 20 using sensor data provided by a motion or position tracking device 30. In this manner, system controller 90, based on sensor data provided by position tracking device 30, may determine when and where contact is made between the user's skin and the touch surface 20.

In some embodiments, the position tracking device 30 comprises a camera or other sensor which may monitor the relative positions of the user (e.g., the user's hand or finger) and the touch surface 20 when both the user and the touch surface 20 are at least partially within a field of view of the position tracking device 30. This information may be communicated (e.g., via a wired or wireless signal connection) from the position tracking device 3 to the system controller 90.

The surface heating system 40 of system 10 is generally configured to selectively heat the touch surface 20 to thereby provide a desired temperature distribution across the touch surface 20. For example, surface heating system 40 may provide a desired temperature distribution or gradient across touch surface 20 in both the X dimension and the Y dimension. As will be discussed further herein, the temperature distribution across touch surface 20 provided by surface heating system 40 may be controlled by system controller 90 to modulate the friction of between the user's skin and the touch surface 20 and thereby render a haptic effect discernable to a user of device 12. In this manner, the haptic effect may mimic interaction with a virtual object corresponding to the haptic effect.

The temperature distribution across touch surface 20 produced by surface heating system 40 may be associated with one or more virtual objects associated with one or more corresponding visual objects 5. For instance, the location of the haptic effect and corresponding virtual object along touch surface 20 may be co-located with a corresponding visual object 5.

In this exemplary embodiment, surface heating system 40 generally includes an array of thermal or heating elements 42 (shown exaggerated in size in FIGS. 1 and 2) positioned across the touch surface 20 in a predefined, grid-like pattern, and an electrical circuit 46 connected to the plurality of heating elements 42. It may be understood that while heating elements 42 and circuit 46 are visible in FIG. 1, this is only for illustrative purposes to show the grid-like arrangement of heating elements 42 across touch surface 20. In this exemplary embodiment, heating elements 42 are configured to generate heat which is transferred to the touch surface 20. However, in other embodiments, the heating elements 42 may comprise other types of thermal devices such as cooling elements configured to cool the touch surface 20 to thereby produce a predefined temperature profile across the touch surface 20 corresponding to one or more associated haptic effects. Additionally, it may be understood that in practice visual object 5 displayable on touch surface 20 may be co-located with one or more of the heating elements 42 and is shown as located in one of the corners of touch surface 20 in FIG. 1 in the interest of clarity.

In some embodiments, system controller 90 may control the heating elements 42 to form an elevated temperature pattern on the touch surface 20 which is co-located with a corresponding haptic effect discernible by the user. The elevated temperature pattern may comprise a portion of the touch surface which is heated above ambient temperature by the heating elements 42. Being heated above ambient temperature, the surface friction of touch surface 20 across the elevated temperature pattern varies from the surface friction across at least a portion of the remainder of the touch surface 20, permitting the touch surface 20 to mimic interaction with a corresponding virtual object at the location of the haptic effect. In some embodiments, the elevated temperature pattern may vary in temperature thereacross to provide a variable surface friction along the elevated temperature pattern.

Electrical circuit 46 (shown schematically in FIG. 1) electrically interconnects the plurality of heating elements 42 and electrically connects each of the heating elements 42 to the system controller 90 and potentially an on-board power source contained within housing 12. In some embodiments, electrical circuit 46 comprises a multiplexing circuit that allows system controller 90 to individually control the heating elements 42 of heating system 40.

In this exemplary embodiment, heating elements 42 are arranged in separate rows extending in the X-dimension and in separate columns arranged in the Y-dimension. It may be understood that in other embodiments the predefined layout and arrangement of heating elements 42 across touch surface 20 may vary. In still other embodiments, the surface heating system 40 may include only a single heating element 42 positioned along the touch surface 20.

Heating elements 42 are configured to heat one or more regions of the touch surface 20 to a temperature that is greater than room temperature. The heating elements 42 may be electrically powered by an electrical power source (e.g., one or more batteries) stored within the housing 12 of system 10. For example, heating elements 42 may comprise electrically powered resistive heating elements or heaters each of which may produce a range of temperatures in the touch surface 20. In this exemplary embodiment, heating elements 42 each comprise resistive heating elements which produce a temperature in proportion to an electrical power received by the heating element. Thus, a variety of different temperatures may be provided by the heating element 42 by varying the amount of electrical power (e.g., by varying a voltage) received by a heating element 42. While in this exemplary embodiment the heating elements 52 comprise resistive heating elements, it may be understood that in other embodiments the configuration of heating elements 42 may vary. For example, in other embodiments, heating elements 42 may comprise an optical heating element, a chemical heating element, an inductive heating element, a dielectric heating element, a thermoelectric heating element or device such as a Peltier heating element that uses the Peltier effect to create a heat flux at a junction of two different kinds of materials, etc. For example, thermoelectric heating elements may be used to selectively heat one or more portions of the touch surface 20 to a temperature greater than ambient temperature or to cool one or more portions of the touch surface 20 (e.g., to return the one or more portions of the touch surface 20 to room temperature) The use of thermoelectric heating elements may thus render superfluous a separate cooling system.

As will be discussed further herein, heating elements 42 may be individually controlled by the system controller 90 to achieve a desired temperature distribution across the touch surface 20 associated with a particular haptic effect and corresponding virtual object. The temperature distribution across the touch surface 20 provided by the individually controlled heating elements 42 modulates the friction between the user's skin and the touch surface 20 as experienced by a user of the system 10 contacting the touch surface 20. For example, one or more heating elements 42 in proximity of a desired location along touch surface 20 for producing a haptic effect may be activated by system controller 90 to elevate a temperature of the touch screen 2 at or near the desired location to render the haptic effect at the desired location.

Additionally, the plurality of heating elements 42 may be activated in a pattern to create virtual shapes and textures. For example, more heating elements 42 with closer spacing 42 may be activated to provide high frequency tactile feedback as finger slides on the touch surface 20. (e.g., frequencies that range from 100 to 400 Hertz (Hz))

The cooling system 70 of system 10 selectably controls desired portions of the touch surface 20 in response to the activation of the heating system 40. Particularly, cooling system 70 assists in ensuring that a desired temperature distribution is provided across touch surface 20 by transferring excess or undesired heat away from the touch surface 20. For example, heat generated by one activated heating element 42 may be undesirably conducted through touch surface 20 to thereby heat regions of surface 20 that are desired to remain at room temperature. As another example, one or more heating elements 42 may transition from an activated state providing a first desired temperature distribution across touch surface 20 to a deactivated state as a second desired temperature distribution (this process controlled by system controller 90) that is different from the first desired temperature distribution. In this exemplary embodiment, cooling system 70 provides cooling to the entire touch surface 20. However, in other embodiments, cooling system 70 may, as controlled by system controller 90, selectably cool only desired portions of the touch surface 20.

In this exemplary embodiment, cooling system 70 comprises one or more fluid conduits including a fluid inlet 72 which extends into the housing 12, and a fluid outlet 74 extending from the housing 12. In this manner, a coolant (e.g., ambient air, etc.) is supplied to an internal chamber of housing 12 by the fluid inlet 72. Excess heat is transferred from the touch surface 20 to the coolant entering the housing 12 via the fluid inlet 72 to thereby heat the coolant. The heated coolant is then exhausted from the housing 12 via fluid outlet 74. The heat received by the coolant from the touch surface 20 may be dumped to the surrounding environment or other heat sink. It may of course be understood that cooling system 70 may include additional components not shown in FIGS. 1 and 2. Additionally, it may be understood that the configuration of cooling system 70 shown in FIGS. 1 and 2 is only exemplary, and the configuration of cooling system may vary in other embodiments. In still other embodiments, system 10 may not include a cooling system altogether.

Figure 3:
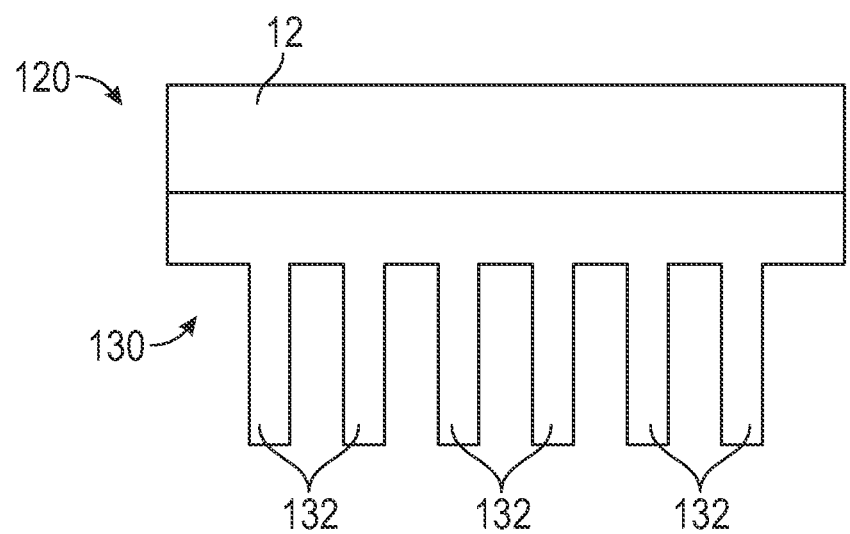
FIGS. 3 and 4 are schematic views of additional embodiments of systems for providing tactile feedback to a user.

For example, and referring briefly to FIG. 3, another embodiment of a system 120 for providing tactile feedback to a user is shown, the system 120 including a cooling system 130. System 120 may include features in common with the system 10 shown in FIGS. 1 and 2, and shared features are labeled similarly. Particularly, system 120 is similar to system 10 except that it includes cooling system 130 in lieu of the cooling system 70 described above. In this exemplary embodiment, cooling system 132 generally includes a plurality of exterior fins 132 which are configured to channel heat away from the touch surface 20. In some embodiments, an air blower or other device is positioned proximal the fins 132 to thereby circulate ambient air over the exterior fins 132 to transfer heat captured by the fins 132 of cooling system 130 to the surrounding environment.

Figure 4:
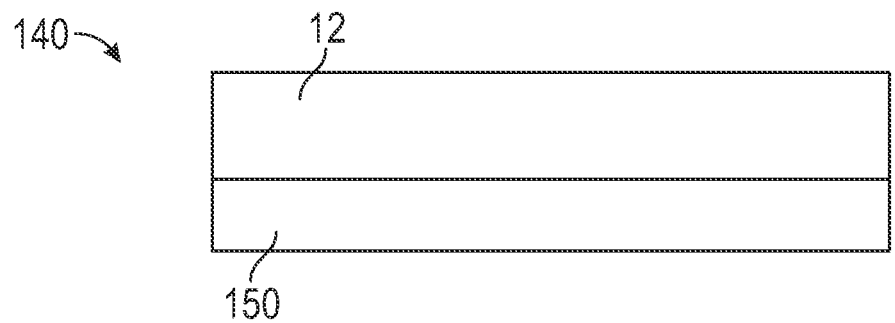

Referring briefly to FIG. 4, another embodiment of a system 140 for providing tactile feedback to a user is shown, the system 140 including a cooling system 140. System 140 may include features in common with the system 10 shown in FIGS. 1 and 2, and shared features are labeled similarly. Particularly, system 140 is similar to system 10 except that it includes cooling system 150 in lieu of the cooling system 70 described above. In this exemplary embodiment, cooling system 140 comprises one or more fluid conduits or heat pipes filled with a cooling fluid or liquid such as water that capture heat from the touch surface 20 and transport the captured heat to a heat sink such as the surrounding environment. The one or more heat pipes of cooling system 140 may be combined with the cooling fins 132 shown in FIG. 3 to form a single, combined cooling system.

Referring again to FIGS. 1 and 2, the system controller 90 of system 10 controls the operation of one or more components of system 10 including heating system 40 and cooling system 70. In this exemplary embodiment, system controller 90 generally includes a processor 92 (which may be referred to as a central processor unit or CPU) that is in communication with one or more memory devices 94, and input/output (I/O) devices which may include the touchscreen 25 of system 10. The processor 92 may be implemented as one or more CPU chips. The memory devices 94 of system controller 90 may include secondary storage (e.g., one or more disk drives, etc.), a non-volatile memory device such as read only memory (ROM), and a volatile memory device such as random-access memory (RAM). In some contexts, the secondary storage ROM, and/or RAM comprising the memory devices 94 of system controller 90 may be referred to as a non-transitory computer readable medium or a computer readable storage media. The I/O devices, in addition to touch screen 25, may include printers, video monitors, liquid crystal displays (LCDs), keyboards, keypads, switches, dials, mice, and/or other well-known input devices. Although shown as including a single CPU 92, and a single memory device 94, it may be understood that system controller 90 may include a plurality of separate CPUs 92, memory devices 94, and the I/O devices. It may also be understood that system controller 90 may be embodied in a networked computing system such as a cloud computing environment in which, for example, components of controller 90 are executed and/or stored in the cloud rather than locally on a single computer.

It is understood that by programming and/or loading executable instructions onto the system controller 90, at least one of the CPU 92, the memory devices 94 are changed, transforming the system controller 90 in part into a particular machine or apparatus having the novel functionality taught by the present disclosure. Additionally, after the system controller 90 is turned on or booted, the CPU 92 may execute a computer program or application. For example, the CPU 92 may execute software or firmware stored in the memory devices 94. During execution, an application may load instructions into the CPU 92, for example load some of the instructions of the application into a cache of the CPU 92. In some contexts, an application that is executed may be said to configure the CPU 92 to do something, e.g., to configure the CPU 92 to perform the function or functions promoted by the subject application. When the CPU 92 is configured in this way by the application, the CPU 92 becomes a specific purpose computer or a specific purpose machine.

In some embodiments, the memory devices 94 of system controller 90 store one or more predefined and distinct temperature profiles or distributions of the touch surface 20 and which are providable by the heating elements 42. For example, memory devices 94 may store a predefined first temperature profile or distribution of touch surface 20 that corresponds to a first haptic effect mimicking a first virtual object. In some embodiments, system controller 90 may be configured to activate heating elements 42 to produce the first temperature profile across touch surface 20 in response to the first visual object 5 being displayed on a visual surface (touch surface 20 in this exemplary embodiment). In some embodiments, system controller 90 may, in activating the heating elements 42, modulate a friction over a portion of the touch surface 20 occupied by the first visual object 5. The system controller 90 may, in modulating the friction over the portion of the touch surface 20, mimic a first texture associated with the first virtual object.

In addition to the above, system controller 90 may be configured to activate heating elements 42 to produce a predefined second temperature profile or distribution across touch surface 20 that corresponds to a second haptic effect mimicking a second virtual object, where both the second haptic effect is different from the first haptic effect and the second virtual object is different from the first virtual object. The system controller 90 may, in activating the heating elements 42 to produce the second temperature profile, may mimic a second texture associated with the second virtual object that is different from the first texture. The change in texture may be accomplished by varying which heating elements 42 are activated, the magnitude of the heat produced by one or more heating elements 42, and the frequency at which one or more of the heating elements 42 are activated. In some embodiments, system controller 90 may activate heating elements 42 to produce a predefined third temperature profile across the touch surface 20 that corresponds to a third haptic effect mimicking a third virtual object, and so on.

Figure 5:
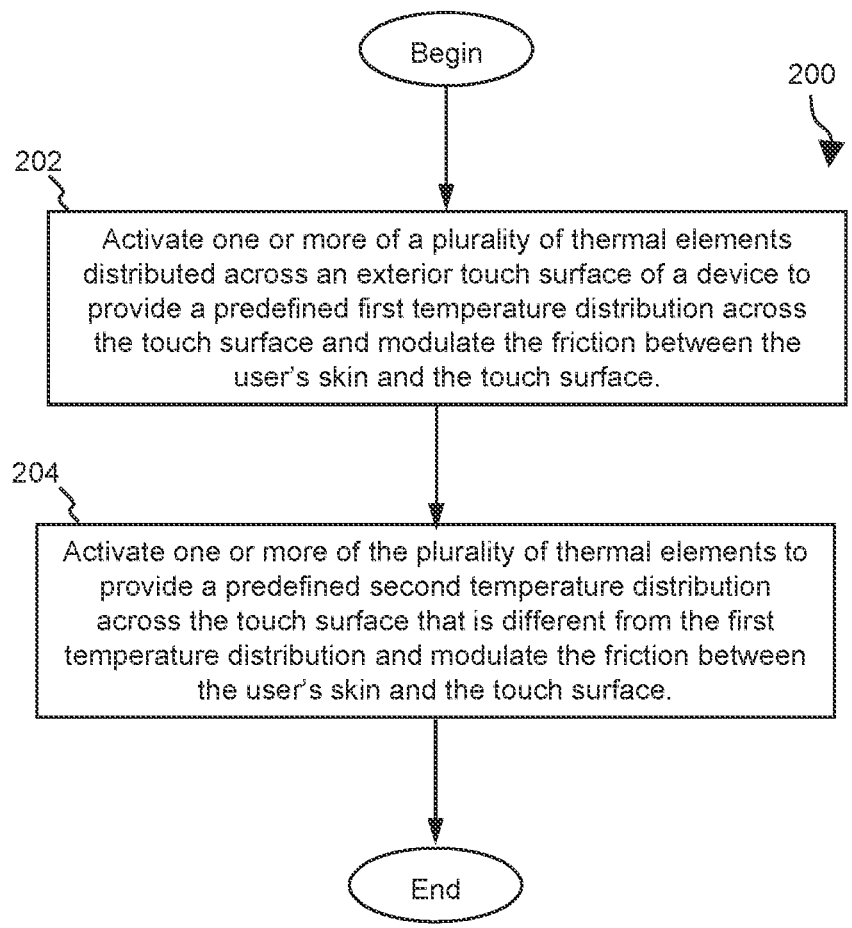
FIG. 5 is a flowchart of an embodiment of a method for providing tactile feedback to a user.

In some embodiments, system controller 90 may receive data corresponding to the current temperature of one or more portions of the touch surface 20 as sensor feedback in controlling the operation of heating elements 42. For example, in some embodiments, heating elements 42 may comprise or act as thermistors configured to measure temperature through changes in resistivity. Thus, in at least some embodiments, heating elements 42 also comprise temperature sensors. In other embodiments, temperature sensors separate from heating elements 42 may be provided along the touch surface 20 for monitoring the current temperature profile or temperature distribution thereacross Referring to FIG. 5, an embodiment of a method 200 for providing tactile feedback to a user is shown. In some embodiments, method 200 may be implemented by any of the systems 10, 120, and 140 described above. Beginning at block 202, method 200 includes activating one or more of a plurality of thermal elements distributed across an exterior touch surface of a device to provide a predefined first temperature distribution across the touch surface and modulate the friction between the user's skin and the touch surface. In some embodiments, block 202 comprises activating one or more of the heating elements 42 to modulate the friction between the user's skin and the touch surface 20 and provide a predefined first temperature distribution across the touch surface 20 of the system 10 shown in FIGS. 1 and 2. It may be understood that the touch surface may be the same as a visual surface defined by a visual display of the device. Alternatively, the device may not include a visual display. In some embodiments, a system controller (e.g., system controller 90 shown in FIG. 1) may also control the activation of the thermal elements.

At block 204, method 200 includes activating one or more of the plurality of thermal elements to provide a predefined second temperature distribution across the touch surface that is different from the first temperature distribution and modulate the friction between the user's skin and the touch surface. In some embodiments, block 204 comprises activating one or more of the heating elements 42 of system 10 to modulate the friction between the user's skin and the touch surface 20 and provide a predefined second temperature distribution across the touch surface 20 that is different from the first temperature distribution. In some embodiments, the first temperature distribution and the second temperature distribution may be associated with a first virtual object and a second virtual object, respectively.

Experiments were conducted for modulating finger friction using changes in surface temperature. It may be understood that the following experiments described herein are not intended to limit the scope of this disclosure and upon the embodiments described above and shown in FIGS. 1-4.

Figure 6:
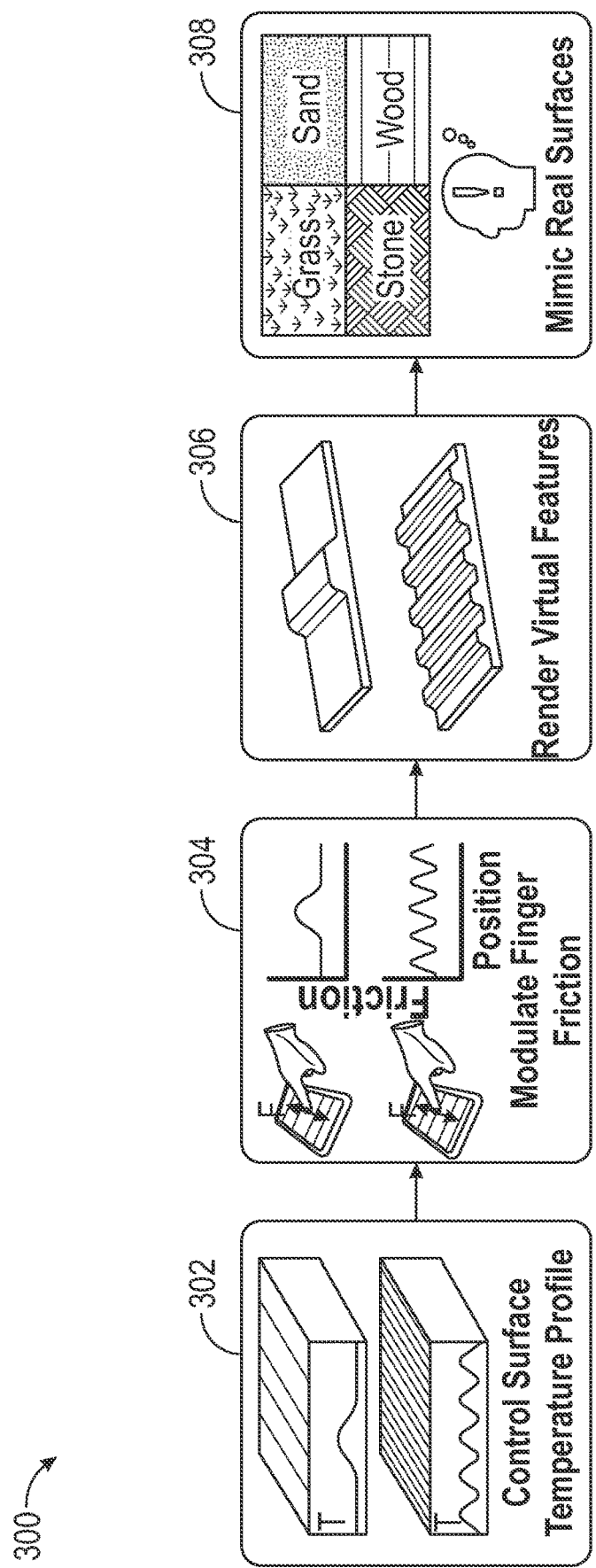
FIG. 6 is a block diagram illustrating an exemplary process for modulating friction of a touch surface.

Particularly, a method was proposed to modulate finger friction using changes in surface temperature to induce changes in the mechanical response of the sliding finger in contact. Referring to FIG. 6, an example of a method 300 to modulate finger friction using changes in surface temperature is shown whereby realistic surfaces may be rendered. In this experiment, it was hypothesized that thermally modulating (indicated by step 302 of method 300) the mechanical properties of the outer layer of sliding skin creates friction-induced vibrations (indicated by step 304 of method 300) without thermal penetration to the thermoreceptor depth, which activate mechanoreceptors and generate haptic perceptions (indicated by block 306 of method 300). In this manner, realistic surfaces may be mimicked (indicated by block 308 of method 300) through the activation of the user's mechanoreceptors.

As part of this experiment, measurements of friction force between a sliding human finger in contact with a glass film at room and high surface temperature (23° and 42° C., respectively) showed ~50% increase in sliding friction. An analytical mechanical model was constructed which considered both the temperature dependence of skin viscoelasticity and the moisture level. The decreased viscoelastic modulus at a higher temperature indicated the reduction of skin stiffness. In addition, the moisture level also works as a plasticizer inside the skin, which further reduces the stiffness. This suggested that the increase of finger friction with temperature is due to a reduction in the mechanical stiffness of the finger skin, which causes an increase in the real contact area.

Figure 7:
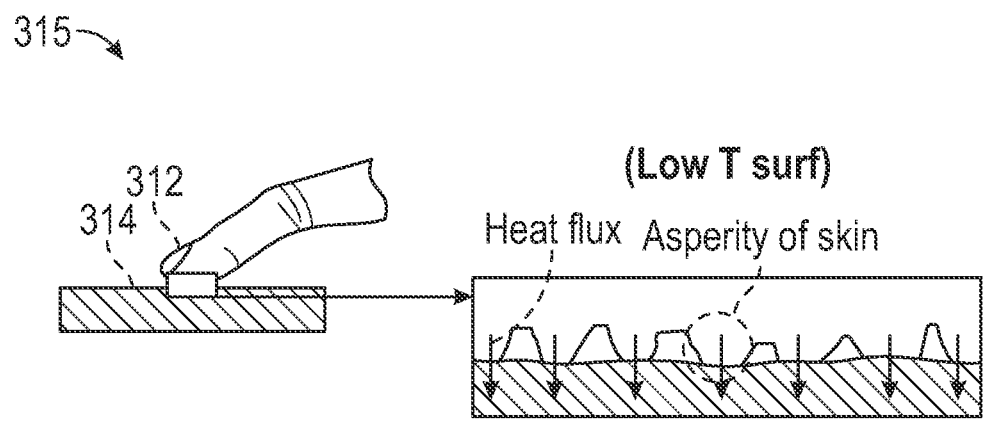
FIGS. 7 and 8 are schematic diagrams illustrating an exemplary heat transfer mechanism that changes the skin temperature and modulates the friction.
Figure 8:
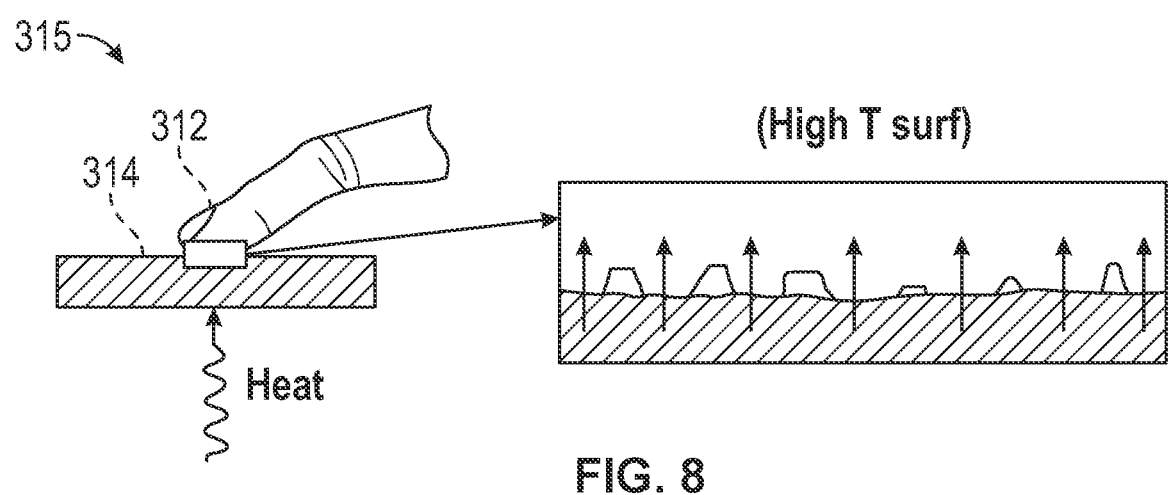
Figure 9:
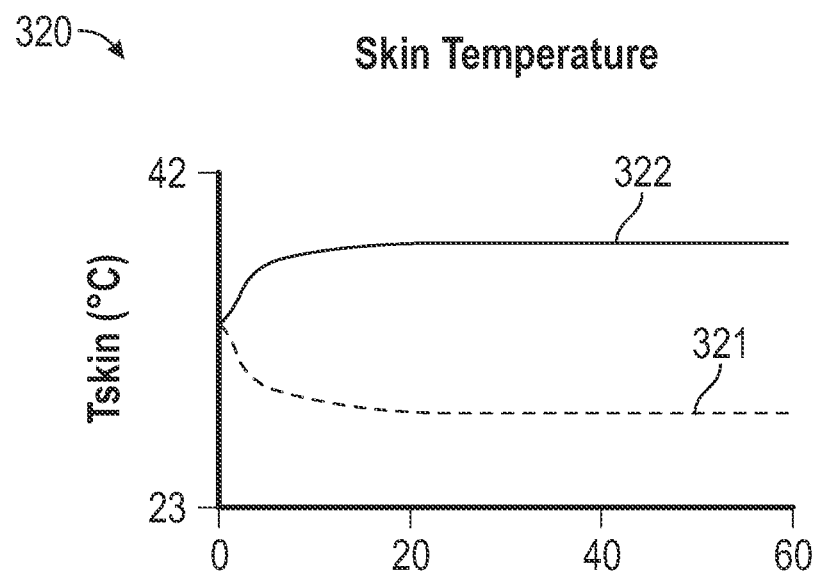
FIG. 9 is a graph illustrating skin temperature as a function of time.
Figure 10:
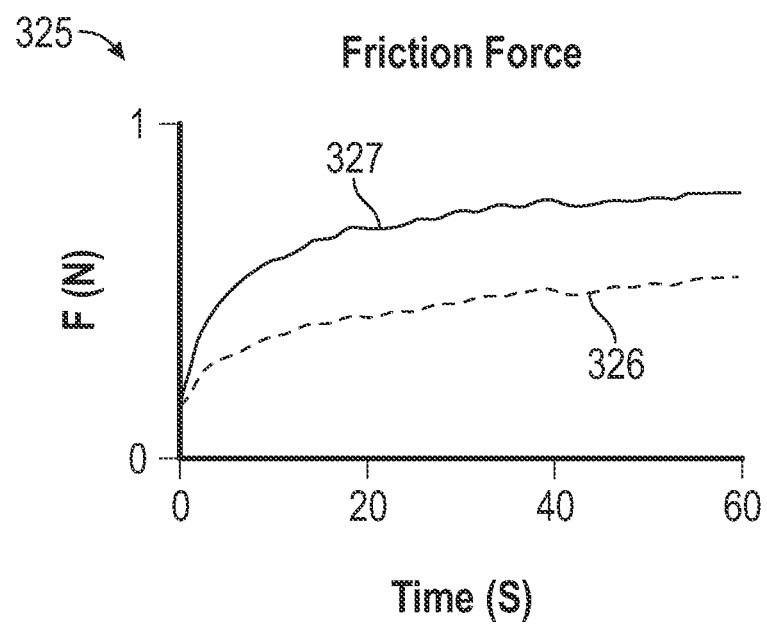
FIG. 10 is a graph illustrating friction force as a function of time.
Figure 11:
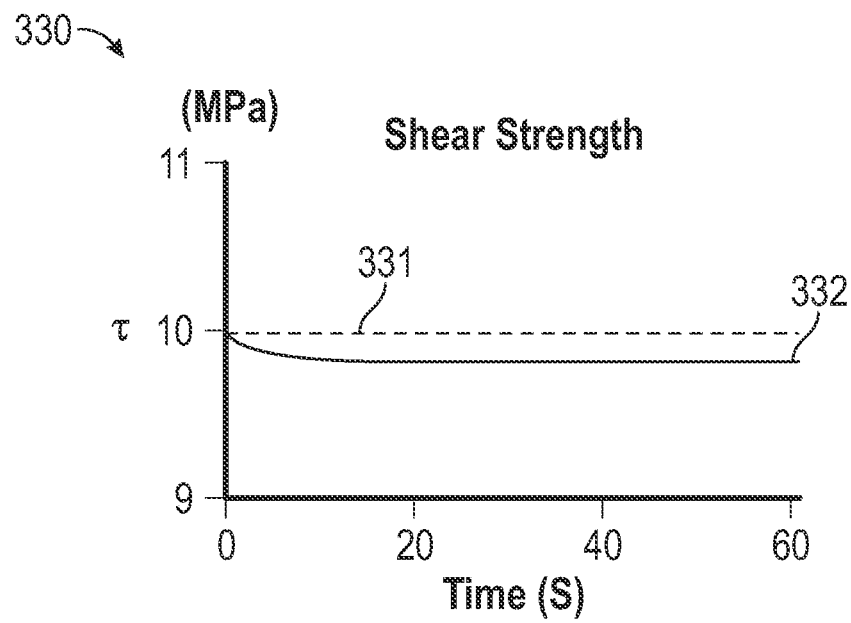
FIG. 11 is a graph illustrating shear strength as a function of time.
Figure 12:
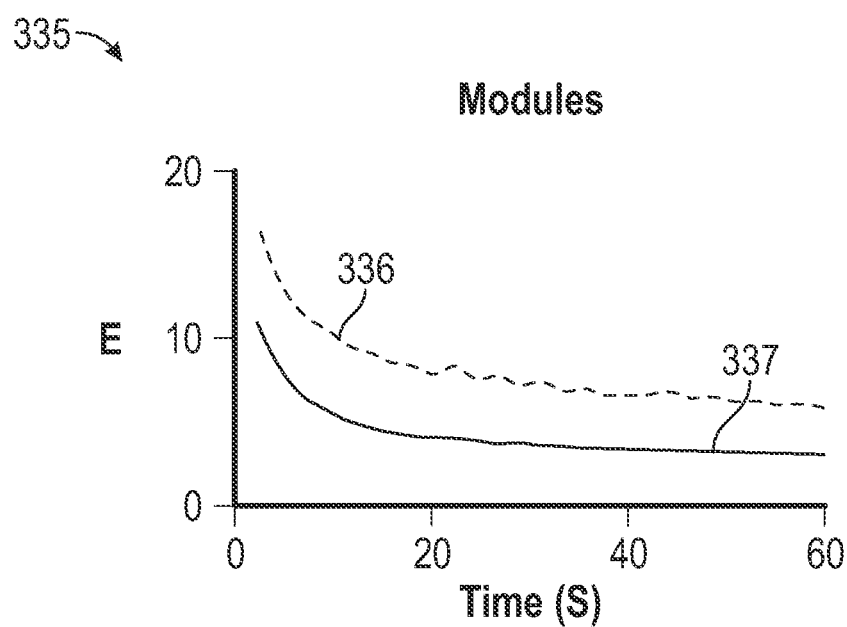
FIG. 12 is a graph illustrating modulus as a function of time.

Referring to FIGS. 7 and 8, diagrams 310 and 315 are shown schematically illustrating the mechanism underlying the temperature effect on finger friction. Particularly, diagram 310 illustrates a finger 312 contacting a surface 314 at room temperature (Low $T_{surf}$) while diagram 315 illustrates finger 312 contacting the surface 314 at high temperature (High $T_{surf}$). The different skin temperatures due to the different surface temperatures induced a change in the interfacial shear strength and viscoelastic modulus of human skin, where the latter was found to be dominant. Referring to FIGS. 9-12, graphs 320, 325, 330, and 335, respectively, are shown illustrating experimental data pertaining to the impact of changes to skin temperature. Particularly, graph 320 of FIG. 9 illustrates skin temperature for both the room temperature (low surface temperature 321) and the high temperature (high surface temperature 322) experiments as a function of time while graph 325 of FIG. 10 illustrates changes in the friction force (low temperature force 326 and high temperature force 327) applied to the finger 312 as a function of time. Additionally, graph 330 of FIG. 11 illustrates shear strength (low temperature strength 331 and high temperature strength 332) as a function of time while graph 335 of FIG. 12 illustrates changes in modulus (low temperature modulus 336 and high temperature modulus 337) as a function of time.

Figure 13:
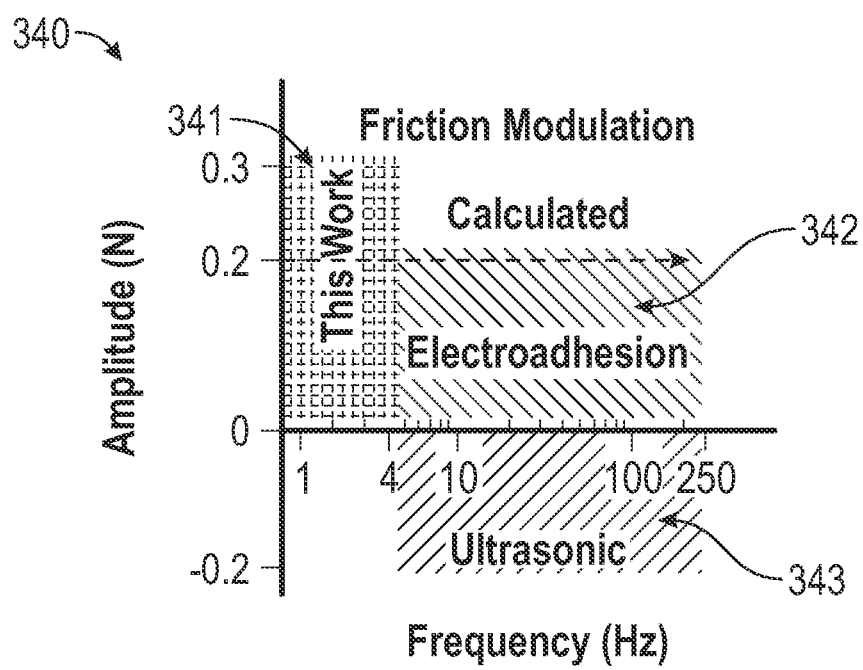
FIG. 13 is a graph illustrating friction modulation amplitude as a function of frequency.
Figure 14:
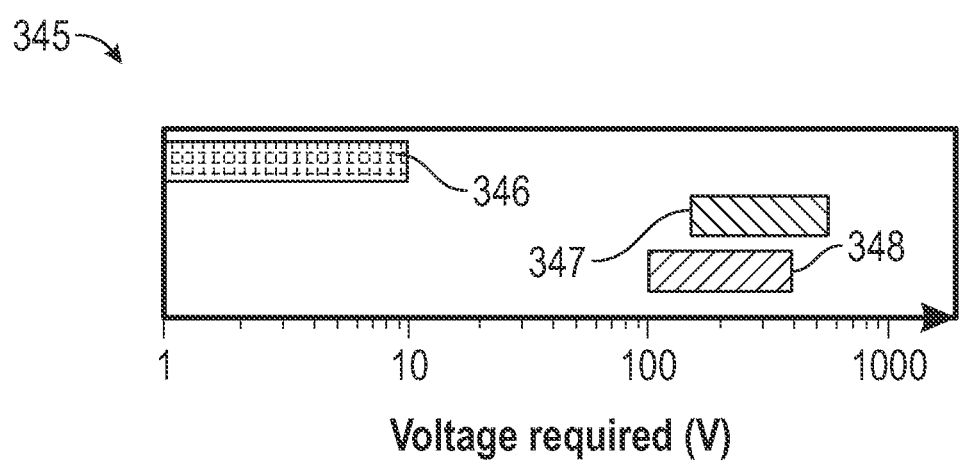
FIG. 14 is a graph comparing required voltage for different friction modulation mechanisms.

Referring to FIGS. 13 and 14, graphs 340 and 345, respectively, are shown which illustrate additional experimental data pertaining to the above experiments. Particularly, graph 340 of FIG. 13 illustrates the friction modulation achieved as a function of frequency through the surface heating conducted as part of this experimental work (identified by arrow 341 in FIG. 13), the friction modulation achieved through electroadhesion (indicated by arrow 342 in FIG. 13, and the friction modulation achieved through ultrasonic stimulation (indicated by arrow 343 in FIG. 13). Additionally, graph 345 of FIG. 14 illustrates exemplary required voltages for surface heating (indicated by arrow 346 in FIG. 14), electroadhesion (indicated by arrow 347 in FIG. 14), and ultrasonic stimulation (indicated by arrow 348 in FIG. 14). Graph 345 illustrates how surface heating voltage 346 as a friction modulator requires significantly less voltage than both electroadhesion voltage 347 and ultrasonic stimulation voltage 348.

The use of localized surface heating was explored for rendering virtual zones and bumps. Numerical finite element thermal simulations of a sliding finger heated with modulation frequencies up to 250 hertz (Hz), combined with known frequency-dependent mechanoreceptor sensitivities, suggested that this technology could be used to render surface textures using miniaturized heater arrays. Thus, the proposed method to modulate friction using surface heating is of great interest for a wide variety of human-machine interactions, such as car displays, mobile devices, and touchscreens.

Figure 15:
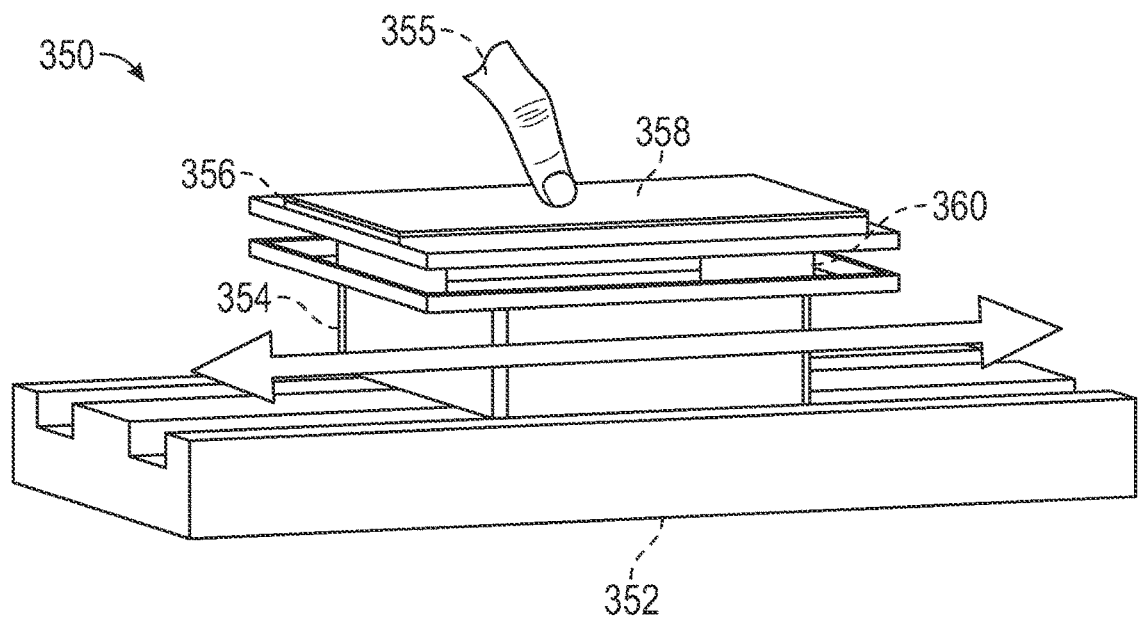
FIG. 15 is a perspective view of an exemplary experimental setup.
Figure 16:
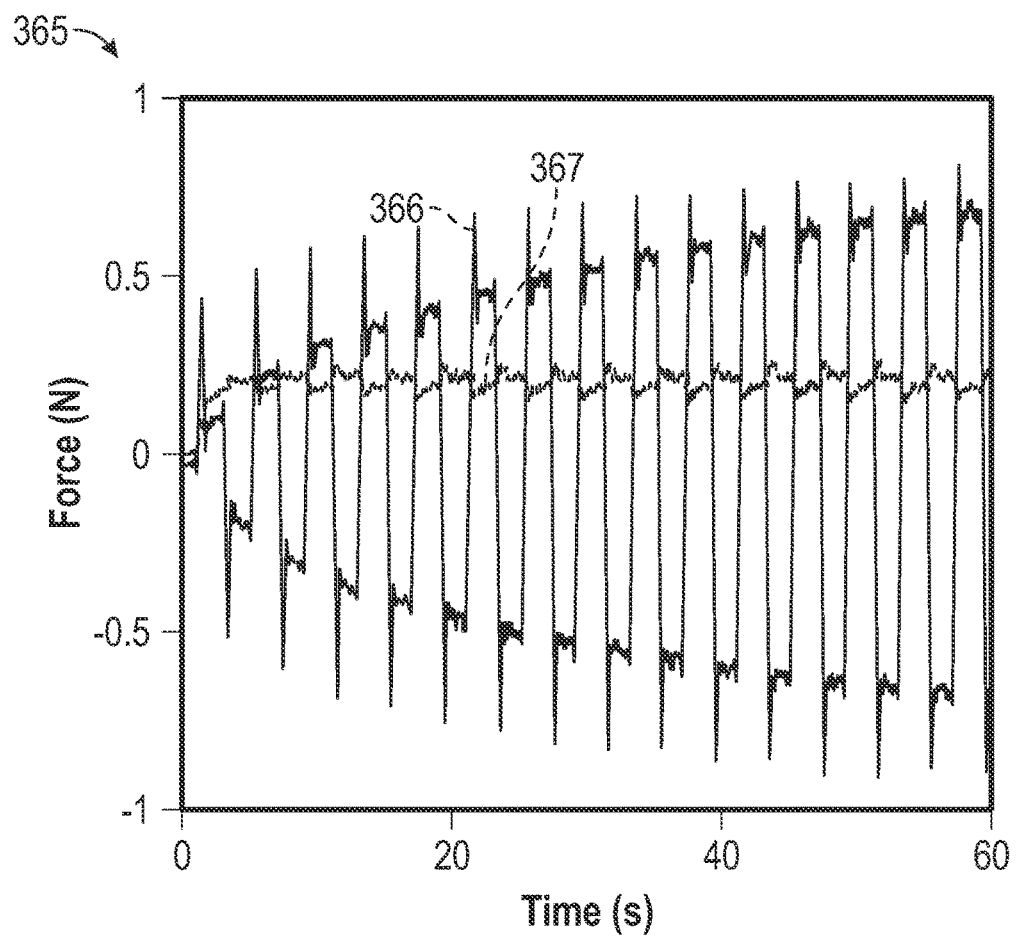
FIGS. 16 and 17 are graphs illustrating frictional and normal forces as a function of time.
Figure 17:
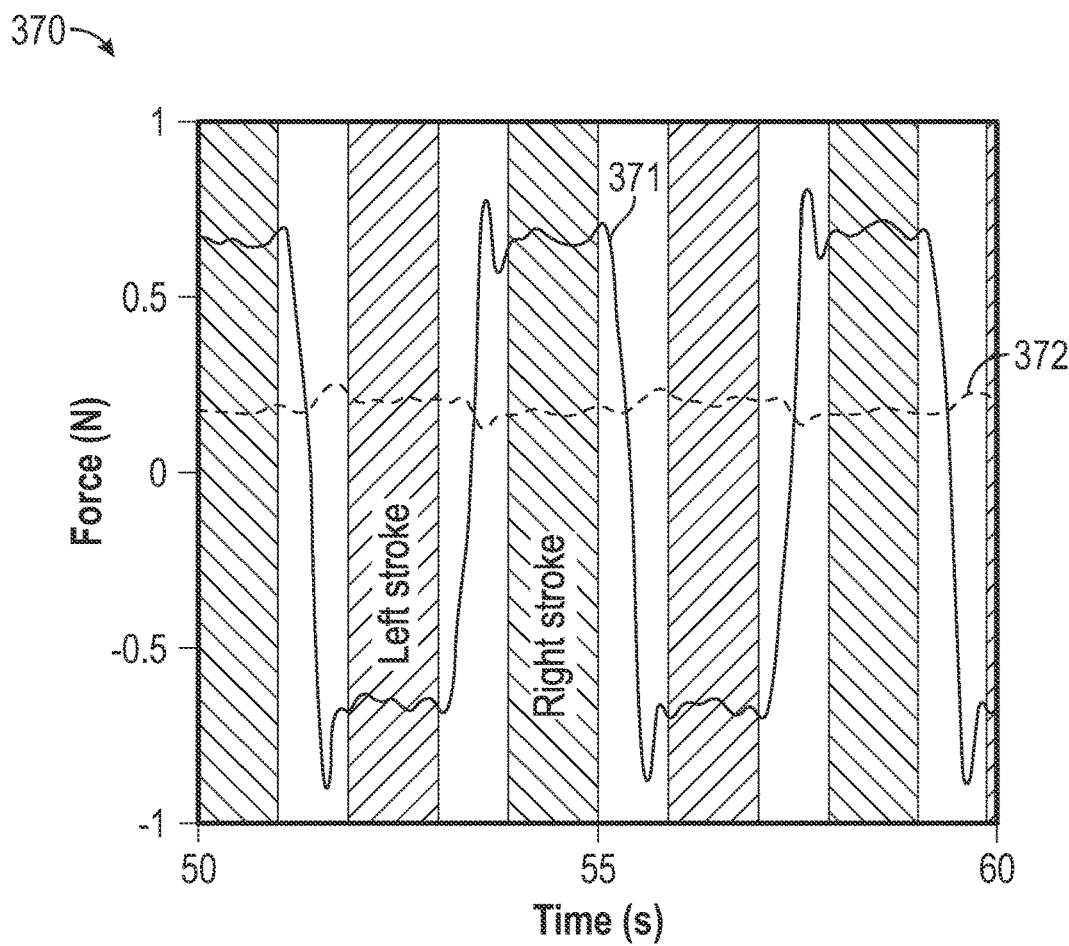

To investigate the temperature effect on the friction of a human finger pad, a custom-built experimental setup was constructed that measured the friction force on a reciprocally moving piece of glass under a controlled normal force and surface temperature. Referring to FIG. 15, a representation of the experimental setup 350 is shown having a sliding guide 352, a sliding stage 354 positioned on the sliding guide 352, a heating element 356 positioned on the sliding stage 354, a glass surface 358 contactable by a finger 355, and a force sensor positioned along the glass surface 358. Referring to FIGS. 15-18, FIGS. 16-18 illustrate graphs 365, 370, and 375, respectively, capturing experimental data obtained from experimental setup 350. Particularly, graph 365 of FIG. 16 illustrates friction forces 366 and normal forces 367 as a function of time. The friction forces 366 were extracted during stable movement of sliding stage 354. Graph 370 of FIG. 17 illustrates variations in frictional forces 371 and normal forces 372 over a ten second period illustrating the different stroke periods of the sliding stage 354.

Figure 18:
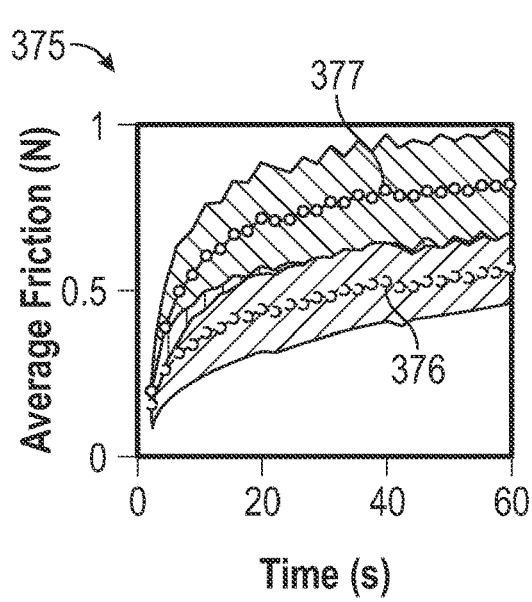
FIG. 18 is a graph illustrating average friction as a function of time.

Graph 375 of FIG. 18 illustrates a first average friction 376 as a function of time for when the glass surface 358 was left at room temperature (approximately 23° C. in this experiment), and a second average friction 377 for when the glass surface 358 was heated to an elevated temperature (approximately 42° C. in this experiment). The shaded areas represent±standard deviation (SD) of the sixteen repeated experimental data points of one participant (right index finger of a 32-year-old male) at each surface temperature (23° and 42° C.). It can be observed that the friction force was larger at higher surface temperature by ~50% in this experiment and the rate of increase in the friction force was higher at a higher surface temperature during the early stage of contact (0 to 20 seconds (s)). Similar behavior was also observed with another participant. Particularly, the friction force under different surface temperatures, sliding speeds, and normal forces were also measured, and the surface temperature showed the strongest influence over friction force when compared with sliding speed and normal force.

Figure 19:
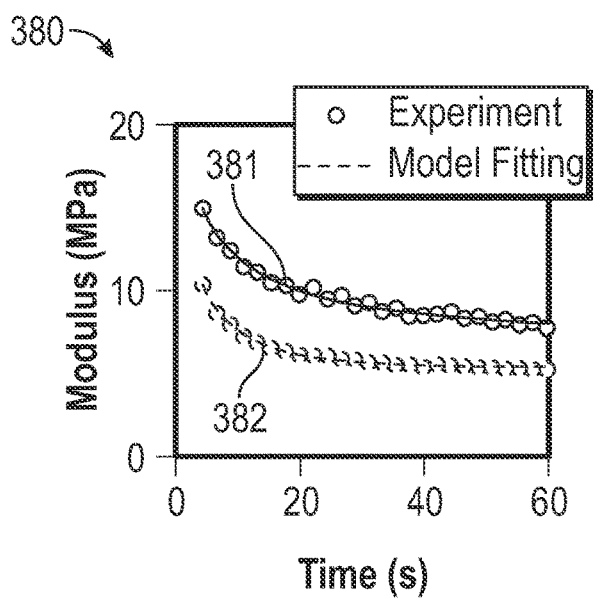
FIG. 19 is a graph illustrating modulus as a function of time.

To understand the mechanism underlying the increase in the friction force in response to different surface temperatures, an analytical mechanical model was developed. In this analysis, the temperature effect on interfacial shear strength and real contact area was studied, as the friction force is a product of the two variables. First, the skin temperature variation with time was calculated when the finger makes sliding contact with glass with different surface temperatures. Referring to FIG. 19, a graph 380 is shown comparing experimental data with model fitting provided by the analytical model. Particularly, graph 380 illustrates a first modulus 381 at room temperature (23° C. in this experiment) as a function of time and a second modulus 382 as the elevated temperature (42° C. in this experiment). The calculated skin temperature was used to theoretically calculate the interfacial shear strength. It was discovered that, within the simulated range, the surface temperature affects the shear strength by less than 3% in this experiment, which cannot explain the 50% change in friction. Therefore, it was hypothesized that the main contribution of the temperature effect on friction comes from the change in real contact area in response to surface temperature.

The effect of surface temperature on the real contact area was analyzed using the standard Kelvin-Voigt viscoelastic model, given that the stratum corneum, the outermost layer of human skin, is a viscoelastic material. In addition, it was found that moisture level increases faster when the finger is sliding on a higher temperature surface, which could reduce the modulus of human skin. By theoretically deriving a modulus model that incorporates the temperature dependence of skin viscoelasticity and moisture level and fitting it with the modulus calculated using friction data (shown in graph 380), lower elasticity and viscosity, and thus shorter time constant, at a higher temperature was found. This is a general behavior of viscoelastic materials with elevated temperature. Table 1 presented below lists the extracted viscoelastic parameters by fitting the model to $E_{sc}$ which represents viscoelastic modulus of the outermost skin layer (Stratum Corneum):

TABLE 1

| Extracted viscoelastic parameters | | | | |
| --- | --- | --- | --- | --- |
| Tsurf (° C.) | η (MPa · s) | E1 (MPa) | E2 (MPa) | τ (s) |
| 23 | 143.38 | 15.49 | 5.62 | 25.50 |
| 42 | 56.47 | 10.06 | 5.24 | 10.77 |

In short, the analysis suggests that the physical mechanism behind the change in friction in response to surface temperature has two terms: temperature dependency of both the viscoelastic modulus and moisture level.

Figure 20:
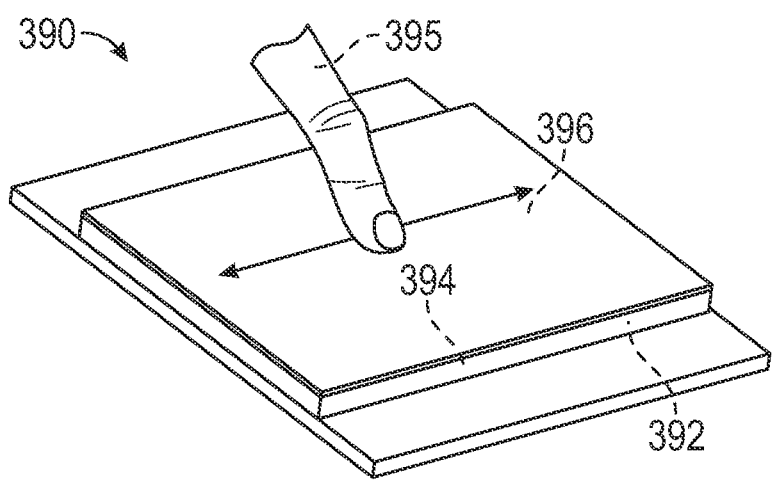
FIG. 20 is a perspective view of another exemplary experimental setup.
Figure 21:
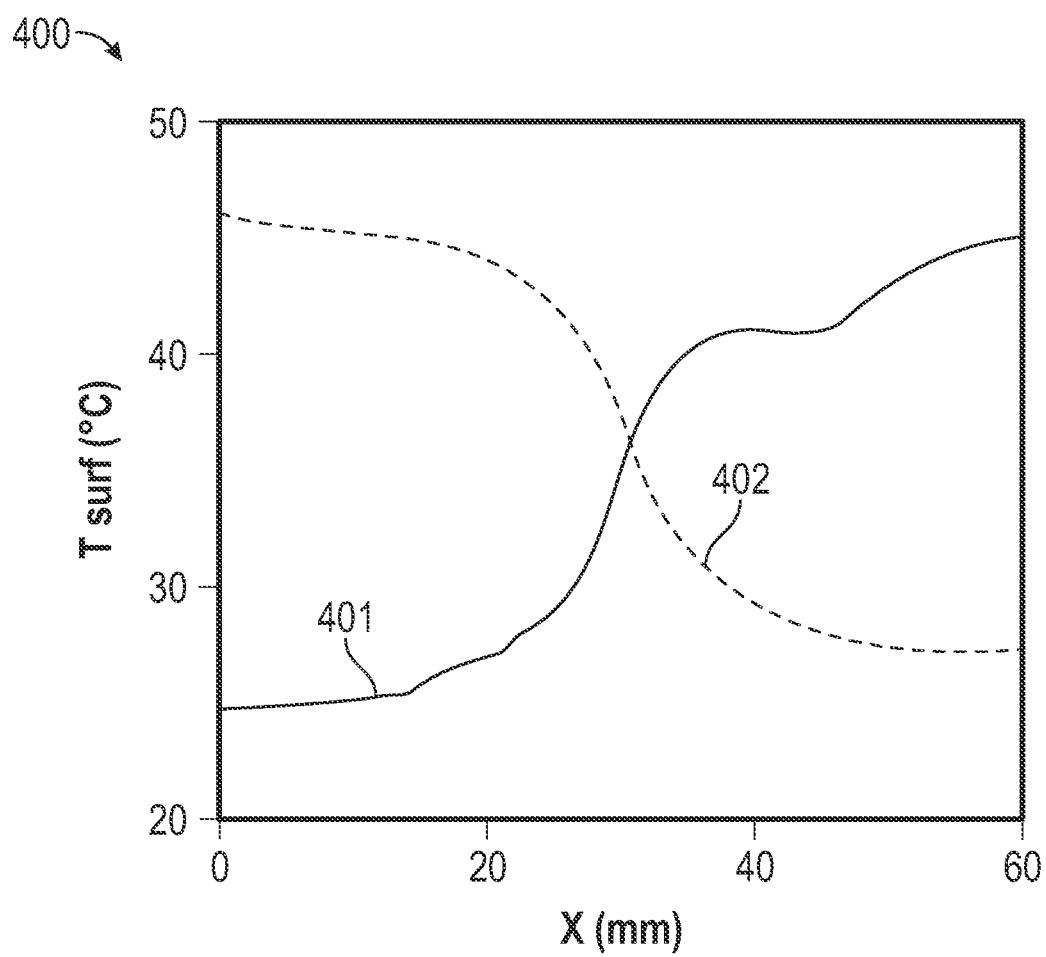
FIG. 21 is a graph illustrating surface temperature as a function of position.
Figure 22:
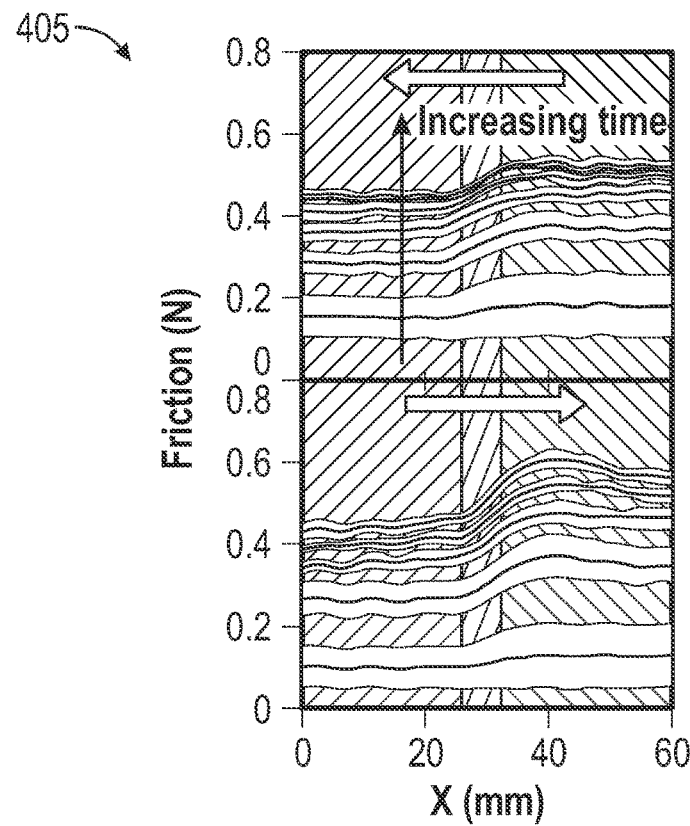
FIGS. 22 and 23 are graphs illustrating frictional force as a function of position.
Figure 23:
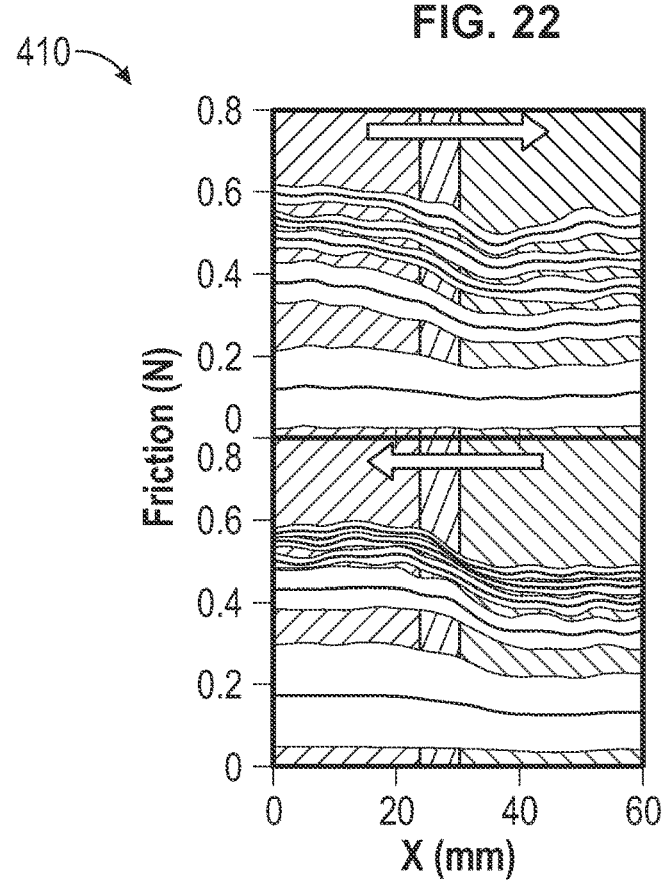

As part of this experimentation, using temperature-modulated finger friction to create virtual features such as zones and bumps was investigated. Particularly, a step-like temperature change was generated using two Peltier elements placed beneath a glass sample. Referring to FIG. 20, a representation of the experimental setup 390 for the virtual zoning experiment is shown. Experimental setup 390 includes a first heater 392 positioned atop a second heater 394, and a glass surface 396 contactable by a finger 395 that is positioned on the first heater 392. Referring to FIGS. 20-23, graphs 400, 405, and 410, respectively, are shown illustrating experimental data captured by experimental setup 390. Particularly, graph 400 of FIG. 21 illustrates a first temperature profile 401 as a function of time of the glass surface 396 when only the first heater 392 is activated and a second temperature profile 402 of the glass surface 396 when only the second heater 394 is activated. The graph 405 shown in FIG. 22 illustrates frictional force as a function of the position of finger 395 along glass surface 396 when only the first heater 392 is activated. Conversely, the graph 410 shown in FIG. 23 illustrates friction force as a function of position when only the second heater 394 is activated. The time evolutions of the friction force after the onset of touch were averaged every 20 s (shown in graphs 405 and 410). The friction forces in the different sliding directions were plotted separately in graphs 405 and 410 to avoid the influence of anisotropy of finger tissue and structure. The friction force stepped up during sliding when the finger transitioned from the low- to high-temperature surface and vice versa. The participant reported the feeling of entering or exiting a "sticky" area when the finger was sliding across the borderline of the heating zone.

Figure 24:
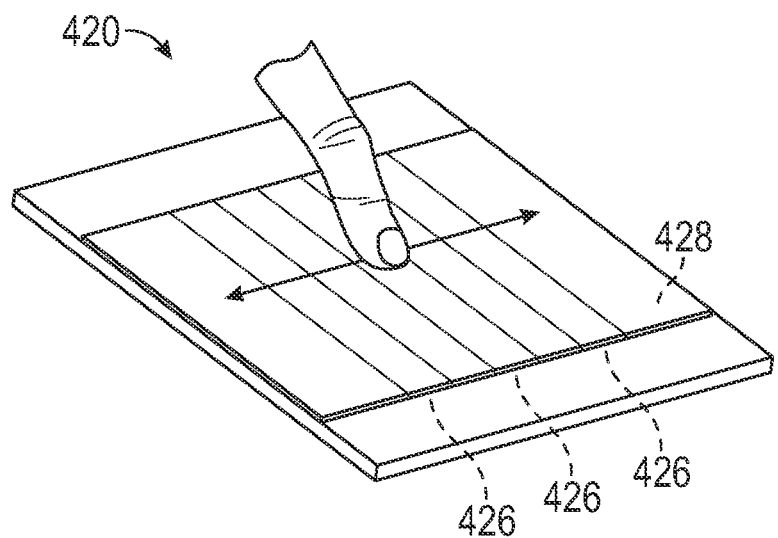
FIG. 24 is a perspective view of another exemplary experimental setup.

As part of this experimentation, rendering of virtual bump(s) was demonstrated using three polyimide strip heaters spatially separated underneath a glass sample. Referring to FIG. 24, a representation of the experimental setup 420 for the virtual bump(s) experiment is shown. Experimental setup 420 includes a first heater 422, a second heater 424, a third heater 426, and a moveable glass surface 428. The heaters 422, 424, and 426 of experimental setup 420 are spaced from each other in the X-dimension. Referring to FIGS. 24-30, each heater 422, 424, and 426, when individually turned on, created bump-like temperature profiles 431 and 432 as shown in graph 430 of FIG. 25. The width of the heater used to create a single bump was 25.6 millimeters (mm), and the width of those used for the three bumps was 12.8 mm. Graph 435 of FIG. 26 illustrates frictional forces 436 and normal forces 347 (measured with a tribometer—the upper portion of graph 435 illustrating the single bump experiment and the lower portion of graph 435 illustrating the three bump experiment) achieved with experimental setup 420 for rendering virtual bumps. The friction data (frictional forces 436) showed that the friction can be modulated in the same way that the surface temperature varies spatially.

Figure 25:
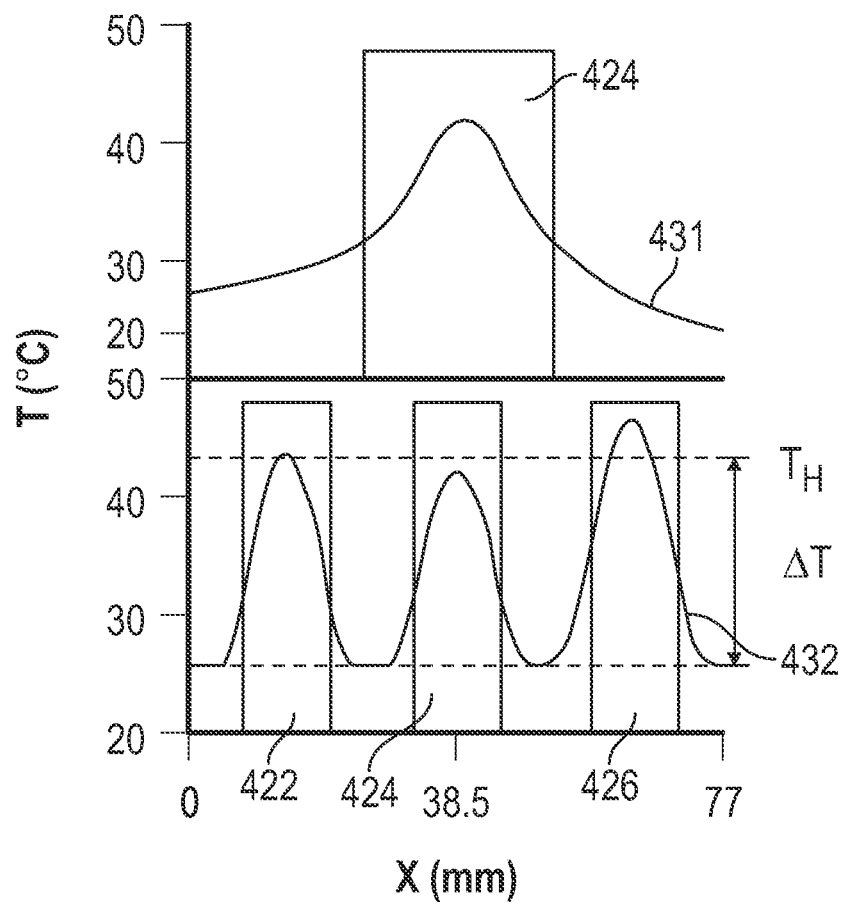
FIG. 25 is a graph illustrating temperature as a function of position.
Figure 26:
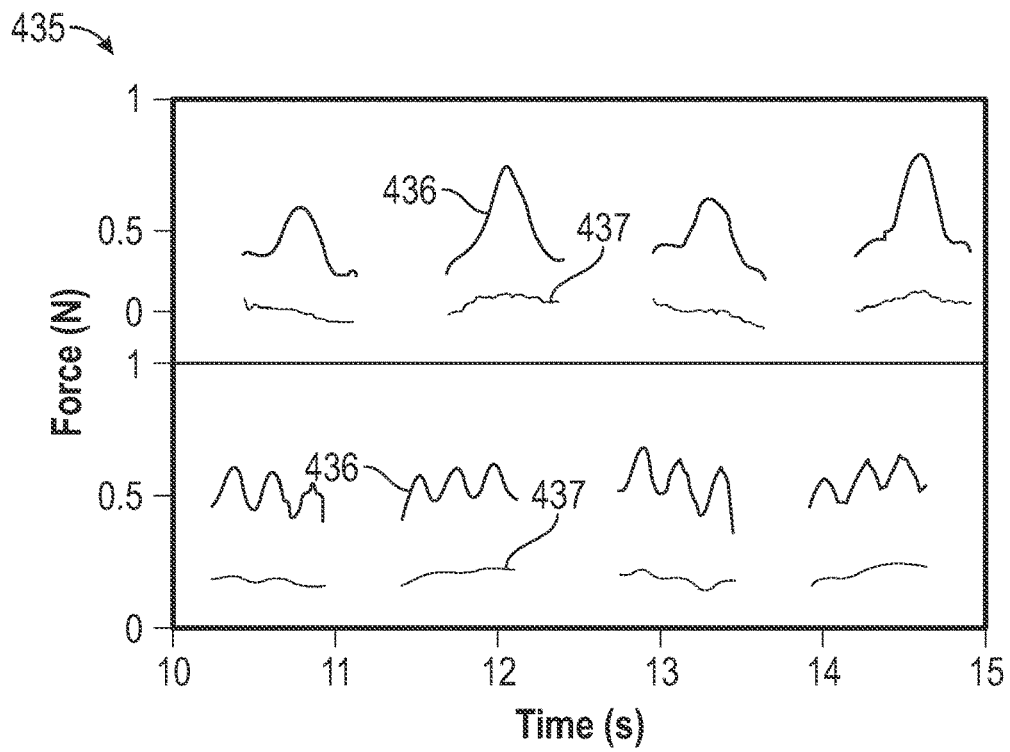
FIG. 26 is a graph illustrating force as a function of time.
Figure 27:
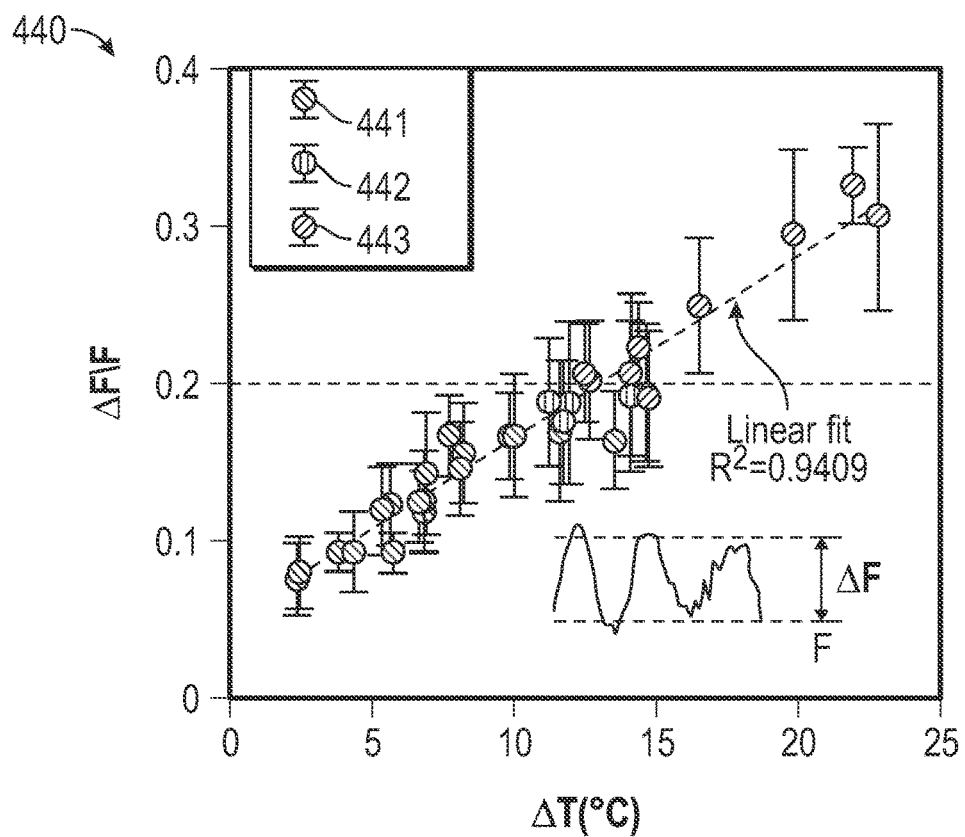
FIG. 27 is a graph illustrating normalized frictional forces as a function of temperature differential.
Figure 28:
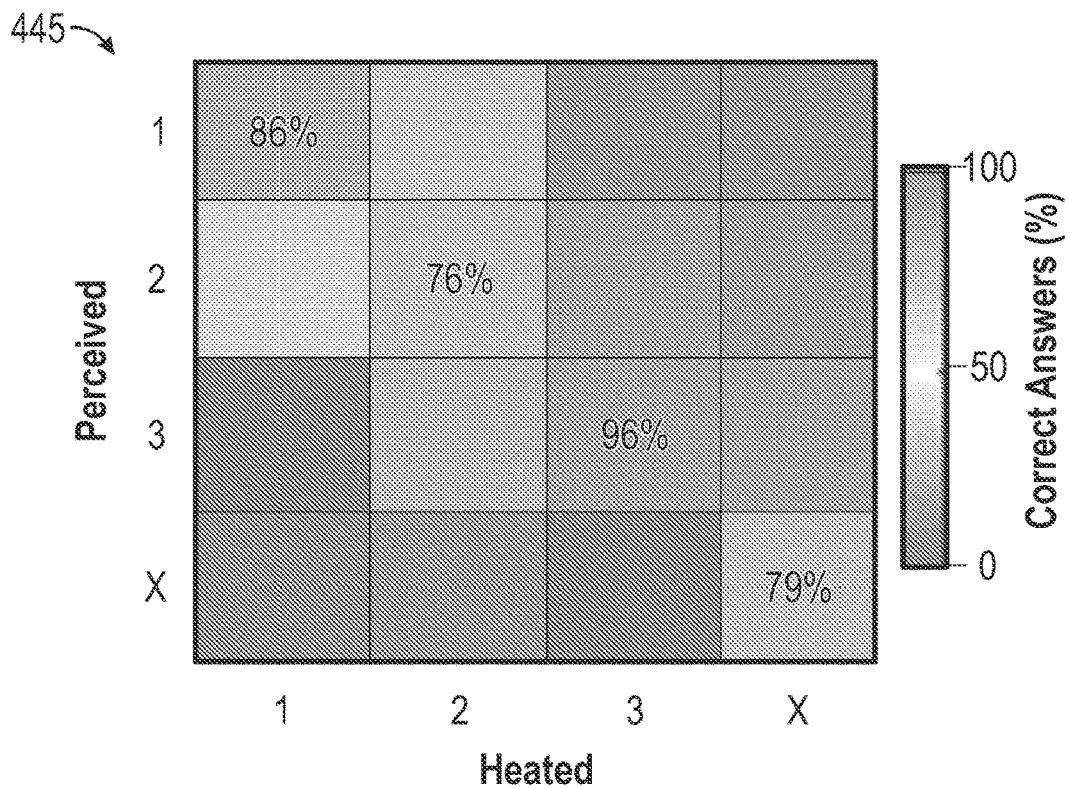
FIG. 28 is a confusion matrix containing information regarding predicted and actual answers in a classification problem.

As shown particularly in graph 430 of FIG. 25, for the case of rendering three bumps, the experiment was further performed under different $\Delta T$. "$T_H$" of graph 430 is the average of the temperature at three upper peaks, and $\Delta T$ is the average of the peak-to-peak amplitudes of the temperature profile. As shown particularly in graph 440 of FIG. 27, the normalized change in friction ($\Delta F/F_{off}$) showed a linear relationship with $\Delta T$. Particularly, graph 440 illustrates the ratio of the peak-to-peak amplitude of friction modulation to the average friction versus the peak-to-peak amplitude of the temperature profile for different answers for perceiving the virtual bump(s): "unperceived" 441, "unclear" 442, and "perceived" 443. Not intending to be bound by any particular theory, according to Weber's law, the ratio of just-noticeable difference, which is represented by the smallest $\Delta F$ that a human can perceive, is linearly proportional to the original stimulus $F_{off}$. In our case, the Weber fraction was found to be approximately 0.2, which was reached at $\Delta T=12$ to 15° C.

Using the proposed method, the friction force can be modulated up to 0.4 Newtons (N) at a low frequency (1 Hz) and under a large temperature gradient. The maximum friction change of 0.4 N approximately corresponds to the bump height of 6 mm according to the relationship between the lateral force and a Gaussian shaped bump. In addition, this method can be used to render fine features like textures using a dense array of heaters at a frequency of 250 Hz, corresponding to a wavelength of 400 µm. For magnitude resolution, distinguishable friction force difference can be determined by the Weber fraction (friction difference $\Delta F$/base friction $F_{base}$) to be ~0.1 N, which was 20% in the study (shown particularly in graph 440) and 10 to 27% in another work.

Psychophysical experiments were performed to investigate whether different users can perceive the proposed thermo-driven friction modulation. These experiments used the same glass sample as the one that was used in the friction measurement. Three 25.6-mm-wide resistive heaters were mounted underneath the glass sample that was overlaid with a 21-point scale with 5-mm spacing for region identification. This chosen scale resolution was smaller than the heater width to determine whether the participants were sensitive to the entire heated width or only the edge where the temperature gradient is high.

Each experiment included 10 randomly ordered trials: two trials for each heater where it alone was heated to 42° C. and four control trials where no heater was activated. Before the trials, the participants were asked to slide their index finger on the glass sample with no heater turned on so that they can feel the intrinsic friction of the glass sample. Before the onset of the experiment series, the participants were asked to sit and wait for 5 minutes (min) to acclimatize themselves in the preset environmental condition to reduce their physiological variation over time (temperature and relative humidity were 23±1° C. and 50±2%, respectively, in this experiment). The skin moisture level was measured before each trial. In each trial, the participants were instructed to slide their dominant index finger along the full stroke of the glass sample (100 mm) until they determine the location of the region that feels differently, if present. The sliding speed was recorded with videos. In each trial, the participants were asked the following:

Before the trial:
1) Are there region(s) in the 21-point scale that feel differently than the rest of the screen?

After the trial:
2) If so, verbally describe the sensation.
3) Did you detect a change in friction?
4) Did you detect a change in temperature?

Figure 29:
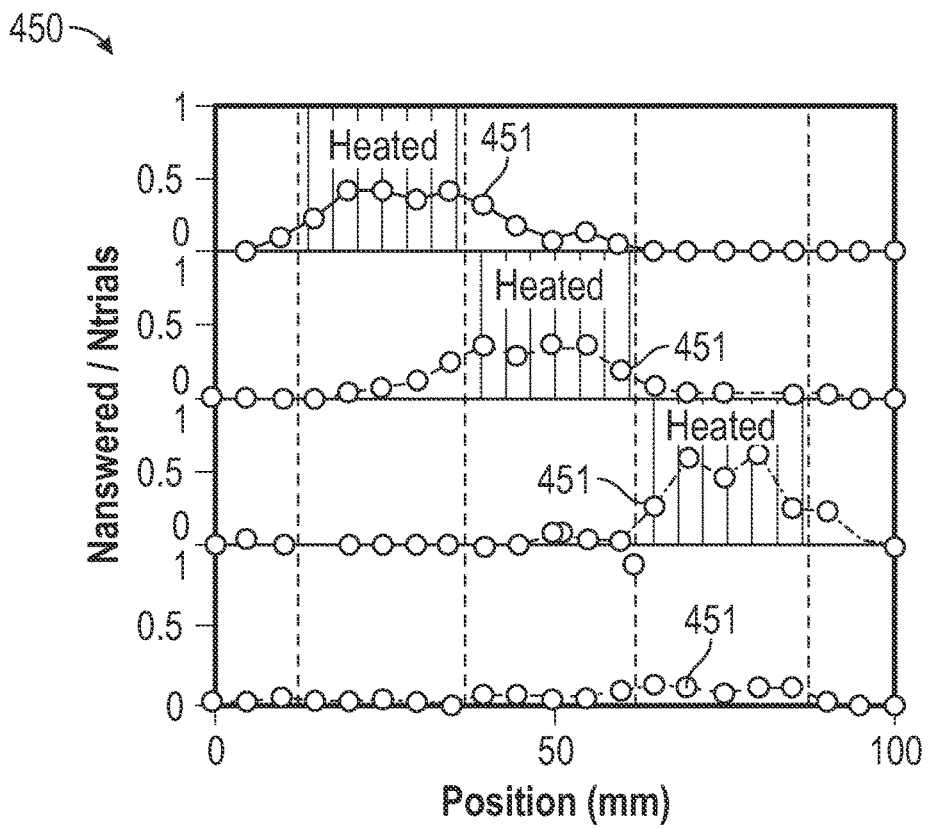
FIG. 29 is a graph illustrating a ratio of a total number of answers to a total number of trials as a function of position.

The participants used the words "high friction," "sticky," "like a bump," etc. to describe the high friction sensation on the heated region. The participants were quite adept at perceiving the friction change and identifying the location when one of the regions was heated. The participant answer time was 28±7 s. The results were plotted in a confusion matrix 445 [a matrix that contains information about predicted and actual answers in classification problems] shown in FIG. 28. Matrix 445 shows a high success rate, 76% to 96% for each stimulus, for participants to correctly identify and locate friction modulation within the active heater region. In addition, graph 450 of FIG. 29 summarizes the ratio 451 of the number of positive answers to the total number of trials ($N_{answered}/N_{trials}$) at each location (measured along X-direction), highlighting relatively higher proportions on the heated region (shaded in FIG. 29) and lower proportions on the unheated regions (unshaded in FIG. 29). Different participants had different perceived widths and distributions of the heated region. Hence, it was not clear whether the participants perceived the entire width of the heated region or the edges. Nevertheless, the participants were able to perceive the friction modulation within the correct location.

Note that in this experiment all twelve participants answered "no" to the question about perceived temperature change after each trial. It was hypothesized that this may be speed dependent, given that the amount of heat transferred between the finger and the heated region is time dependent—the longer the finger stays on the heated region, the larger the total heat transfer. The sliding speed of participants (45 to 125 millimeters per second (mm/s)) was varied using a metronome and asked before the test to tell whether they could feel any temperature change. The answer time was limited to 30 s, given that the average answer time in the psychophysical experiment for identifying different regions in the previous paragraph was 28 s.

Figure 30:
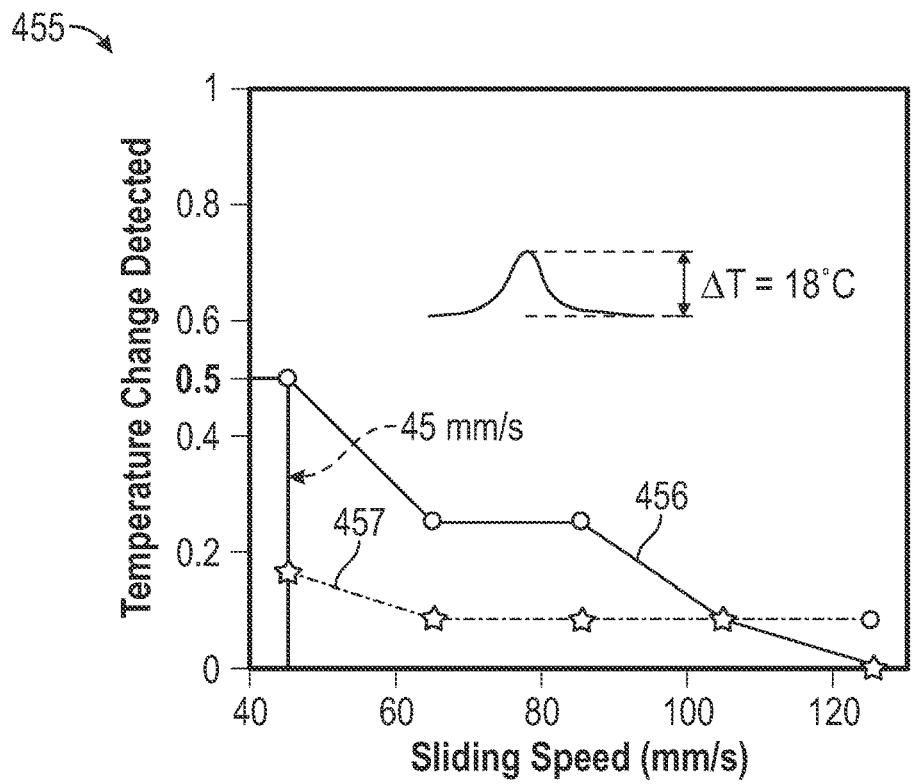
FIG. 30 is a graph illustrating detected temperature change as a function of sliding speed.

In this experiment, the central heater 424 of experimental setup 420 was turned on to achieve ΔT=18° C.—a temperature difference between the heated and unheated regions that corresponded to the heated region temperature of 42° C. Graph 455 of FIG. 30 shows the proportion of temperature change detected under different sliding speeds and ΔT. Particularly, graph 455 illustrates the temperature change detected for the overall data (indicated by arrow 456 in graph 455) and for participants who answered in less than 10 s (indicated by arrow 457 in graph 455).

The stimulus level with a perceived proportion of 0.5 has been widely used in psychometric tests as an absolute threshold. Therefore, the threshold of sliding speed under which the surface temperature can be perceived was determined. The threshold of the sliding speed for detecting temperature change at ΔT=18° C. was 45 mm/s, which was lower than the average sliding speed (85 mm/s) in the psychophysical experiment for identifying virtual bumps, indicating that people cannot perceive the temperature change at the average sliding speed. The proportion of temperature change detected within 10 s is shown by numeral 457 in graph 455, which shows an even lower proportion, meaning that if the users slide their finger for 10 s, then it is unlikely that they will perceive any heat under the given conditions. These results can explain why users cannot perceive the temperature change under the average sliding speed (85 mm/s) and temperature (ΔT=18° C. or $T_{Heated}$=42° C.) while perceiving the friction modulation. Note that, in graph 455, the proportion of participants who detected temperature change at 85 mm/s was not zero. This was the identical condition for identifying different regions (shown particularly in graphs 445 and 450) where the participants did not detect the temperature change. Three participants perceived temperature change by reporting "a little warm" after they were asked to specifically detect whether there was any temperature change. On the contrary, without being specifically asked to look for temperature change, they did not feel the temperature change in the experiment. This was probably due to the difference in the participants' attention: When the attention of the participants is devoted to temperature, they may be more sensitive to the change in temperature.

To investigate physically why the participants were not able to perceive the temperature change, we implemented a computational simulation using ABAQUS was implemented. The thermal perception was analyzed on the basis of the temperature of the warm receptor under different contact conditions. When the finger is sliding on a surface where one 25.6-mm-wide heater is turned on to 42° C., the thermoreceptor temperature overall decreased over time, because the skin was cooled down outside of the heated region after being heated up in the heated region. This condition would not activate the warm receptor, which explains why participants did not perceive temperature changes in the heated region. This analysis indicates that judicious use of the thermal mass of the haptic device, in concert with local heaters, can limit the depth of thermal penetration into the skin to limit thermoreceptor activation.

Figure 31:
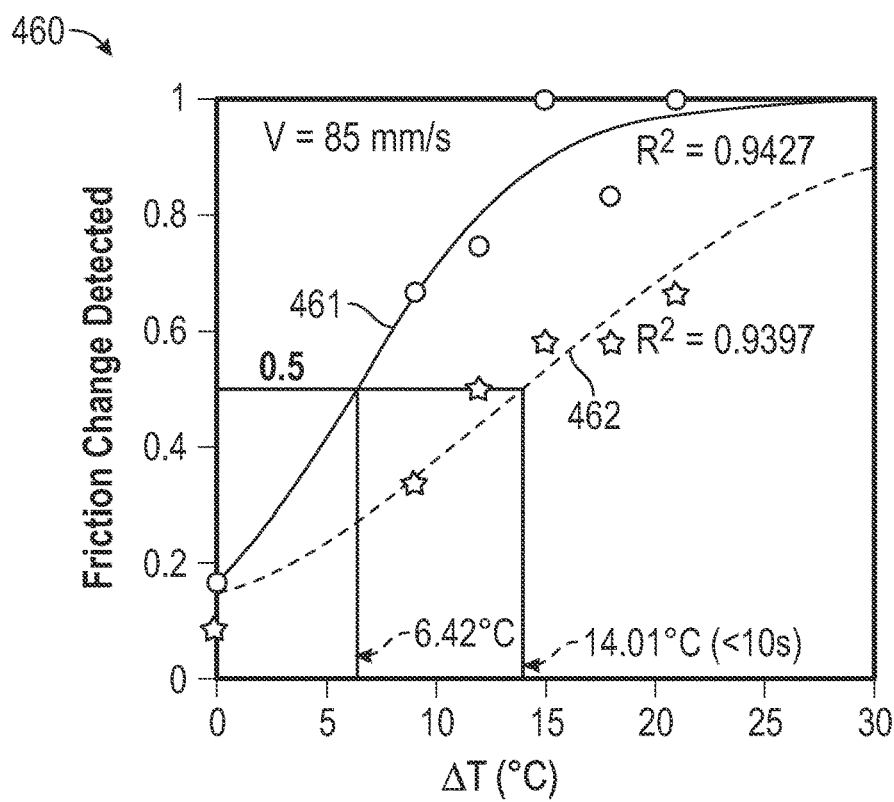
FIG. 31 is a graph illustrating detected friction change as a function of temperature differential.

To determine the threshold temperature needed to generate a perceivable friction modulation, another psychophysical experiment was performed where the participants were asked to answer whether they can feel the friction modulation under different temperatures (ΔT=0°, 9°, 12°, 15°, 18° and 21° C.) during the surface exploration at a sliding speed of 85 mm/s. The rest of the experimental conditions were identical to the ones used in the first psychophysical experiment described above. Referring now to FIG. 31, a graph 460 is shown which illustrates the proportion of participants who were able to detect friction change under different ΔT. Particularly, graph 460 illustrates both the overall data (indicated by arrow 461 in graph 460) and for participants having answered in less than 10 s (indicated by arrow 462 in graph 460). The data of graph 460 were first fitted with a sigmoid function, and a threshold temperature difference ΔT for friction detection was determined with a proportion of 0.5, which was 6.42° C. The threshold temperature difference for detecting friction modulation within 10 s was 14.01° C. The answer time for perceiving the friction change was 11±6 s. Note that the answer time recorded here is only the time needed to perceive friction modulation, which was shorter than the time required to both perceive and spatially locate the friction change (28 s) in the psychophysical experiment documented by graphs i445 and 450.

Although the experimental setup was successful in inducing perception of a series of bumps, the frequency demonstrated above (4 Hz) has not yet been high enough to render virtual texture as in other SHDs. A 2D numerical heat transfer model during finger sliding was developed to examine the theoretical feasibility of rendering virtual textures that stimulate finger surfaces at 100 to 250 Hz. The skin temperature variation during sliding contact of the finger pad with the glass sample/surface under different device configurations was further extracted. The simulated skin temperature variation (peak to peak) on the rendered virtual bump(s) (1 Hz and 4 Hz) were 1.6° and 0.7° C., respectively. It has been demonstrated that humans can perceive the vibrations of smaller amplitudes at a higher frequency due to the increased sensitivity of mechanoreceptors. At 4 Hz, the threshold amplitude of vibration is around 20 μm, whereas at 100 Hz and 250 Hz, the threshold amplitude drops to ~60 and ~20 nm, respectively. Hence, the required amplitude of the friction modulation at high frequency can be estimated based on the frequency dependency of the threshold. Because a linear relationship between the peak-to-peak amplitudes of the surface temperature ΔT and the friction force ΔF was found (shown particularly in graph 440), the required skin temperature modulation ($ΔT_{skin,pp,min}$) can be estimated to be ~2.1×10-3° C. at 100 Hz and ~0.7×10-3° C. at 250 Hz. The numerical results showed that the calculated $Δ_{Tskin,pp}$ for both 100-Hz and 250-Hz cases were larger than the required $ΔT_{skin,pp,min}$, indicating the theoretical possibility of rendering virtual textures at high frequency.

To summarize the experimentation described above, the effect of surface temperature on finger friction and the feasibility of rendering virtual features using varied temperature profiles as a type of SHD were investigated. A large effect of surface temperature on the finger friction was found—enough to generate surface haptic effects comparable to current devices and explained by the temperature dependence of both the viscoelasticity and moisture level of human skin. The potential of rendering virtual features was demonstrated by changing the temperature profiles of a glass sample/surface. The friction force was found to vary accordingly with the temperature profile, and psychophysical studies indicated that the users were able to perceive and localize the virtual bump while they did not detect a surface temperature change. The feasibility of high-frequency friction modulation was investigated through modeling, and it was found that it is theoretically possible to render virtual textures using the proposed method (outlined by method 300 shown in FIG. 6). This experimentation shows that surface heating SHDs have great potential in a wide variety of human-machine interfaces.

In its current form, cooling components, such as a water pump and fan, may help to better define the desired temperature profiles. Although the prototype size could be used in applications such as car displays, future efforts to optimize the design through proper material selection (anisotropic thermal properties), thermal design, and cooling technique may assist in broadening its application to areas such as VR or gaming.

Last, although the entire frequency spectrum of temperature and friction response cannot be attained and the maximum friction modulation amplitude would be decreased at high simulated surface temperature, the mismatch in response times between mechano- and thermoreceptors could be exploited to mimic the effect of many surfaces. For example, a piece of room temperature fabric could be emulated using high-frequency temperature modulation to recreate texture and lower frequency and/or gentle static heating to simulate the reduced thermal transport between skin and fabric relative to the device material. In addition, the surface temperature-induced stiffness reduction discussed herein will affect the threshold and magnitude of friction modulation in any multimodal SHD that uses heating, and should be considered in multimodal SHD design.

While embodiments of the disclosure have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A system for providing tactile feedback to a user, the system comprising:
    a device comprising a touch surface to be touched by the user;
    one or more thermal elements distributed across the touch surface of the device and configured to heat the touch surface and thereby modulate the friction between the user's skin and the touch surface; and
    a controller connected to the one or more thermal elements and configured to control the operation of the one or more thermal elements to provide a plurality of temperature distributions across the touch surface to modulate friction between the user's skin and the touch surface to render a haptic effect discernible by the user and which mimics an interaction between the user's skin and a virtual object;
    wherein the controller is configured to modulate the operation of the one or more thermal elements at a selected non-zero frequency in order to modulate the friction between the user's skin and the touch surface while restricting the heat generated by the one or more thermal elements from penetrating a thermoreceptor depth of the user's skin.

2. The system of claim 1, wherein the touch surface comprises an electronic touchscreen.

3. The system of claim 1, wherein the device is wearable by the user.

4. The system of claim 1, further comprising a cooling system coupled to the touch surface and configured to transfer heat generated by the one or more thermal elements away from the touch surface.

5. The system of claim 4, wherein the cooling system comprises one or more fluid conduits configured to transport a coolant for receiving the heat generated by the one or more thermal elements.

6. The system of claim 1, wherein the one or more thermal elements comprise one or more thermoelectric heating elements.

7. The system of claim 1, wherein the one or more thermal elements comprise at least one of one or more resistive heating elements, one or more optical heating elements, and one or more chemical heating elements.

8. A system for providing tactile feedback to a user, the system comprising:
    a device comprising an exterior touch surface to be touched by the user;
    one or more thermal elements distributed across the touch surface and configured to heat the touch surface and thereby modulate the friction between the user's skin and the touch surface; and
    a controller connected to the one or more thermal elements and configured to control the operation of the one or more thermal elements to heat the touch surface;
    wherein the controller comprises a memory device storing a plurality of distinct temperature profiles providable along the touch surface by the one or more thermal elements to modulate friction between the user's skin and the touch surface to render a haptic effect discernible by the user and which mimics an interaction between the user's skin and a virtual object;
    wherein the controller is configured to modulate the operation of the one or more thermal elements at a selected non-zero frequency in order to modulate the friction between the user's skin and the touch surface while restricting the heat generated by the one or more thermal elements from penetrating a thermoreceptor depth of the user's skin.

9. The system of claim 8, wherein the touch surface comprises an electronic touchscreen.

10. The system of claim 8, wherein the device is wearable by the user.

11. The system of claim 8, further comprising a cooling system coupled to the touch surface and configured to transfer heat generated by the one or more thermal elements away from the touch surface.

12. A method for providing tactile feedback to a user, the method comprising:
    (a) activating at a first selected non-zero frequency one or more of a plurality of thermal elements distributed across an exterior touch surface of a device to provide a predefined first temperature distribution across the touch surface and modulate the friction between the user's skin and the touch surface to render a first haptic effect discernible by the user and which mimics an interaction between the user's skin and a first virtual object while restricting the heat generated by the plurality of thermal elements from penetrating a thermoreceptor depth of the user's skin; and (b) activating at a second selected non-zero frequency one or more of the plurality of thermal elements to provide a predefined second temperature distribution across the touch surface that is different from the first temperature distribution and modulate the friction between the user's skin and the touch surface to render a second haptic effect discernible by the user and which mimics an interaction between the user's skin and a second virtual object while restricting the heat generated by the plurality of thermal elements from penetrating the thermoreceptor depth of the user's skin.

13. The method of claim 12, wherein the first virtual object comprises a first tactile object and the second virtual object is different from the first tactile object.

14. The method of claim 12, further comprising:

(c) transferring by a cooling system heat generated by the plurality of thermal elements away from the touch surface.

15. The method of claim 14, wherein (c) comprises transferring heat from the touch surface to a coolant circulating through the device.

\* \* \* \* \*